(12) United States Patent
Cragun

(10) Patent No.: US 6,177,936 B1
(45) Date of Patent: Jan. 23, 2001

(54) BROWSER HIERARCHICAL CONTEXTUAL INFORMATION FOR WEB PAGES

(75) Inventor: Brian John Cragun, Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/137,382

(22) Filed: Aug. 20, 1998

(51) Int. Cl.[7] .................................................. G06F 3/00
(52) U.S. Cl. ..................... 345/340; 345/329; 345/346; 345/356; 707/501; 709/201; 709/217
(58) Field of Search .................................... 345/356, 357, 345/340, 346, 329; 707/501; 709/217, 218, 219, 201

(56) References Cited

U.S. PATENT DOCUMENTS

| | | | |
|---|---|---|---|
| 5,625,781 | * | 4/1997 | Cline et al. .......................... 345/335 |
| 5,712,979 | * | 1/1998 | Graber et al. ........................ 709/224 |
| 5,724,595 | * | 3/1998 | Gentner ................................ 707/501 |
| 5,768,578 | * | 6/1998 | Kirk et al. ............................ 707/100 |
| 5,801,702 | * | 9/1998 | Dolan et al. ......................... 345/357 |
| 5,854,630 | * | 12/1998 | Nielsen .............................. 345/352 |

\* cited by examiner

Primary Examiner—Raymond J. Bayerl
Assistant Examiner—Cuong T. Thai
(74) Attorney, Agent, or Firm—Owen J. Gamon

(57) ABSTRACT

A mechanism for providing contextual information for a web page. In the preferred embodiment, a browser displays multiple web pages in multiple windows in a parent-child hierarchy on a display screen. The browser maintains this hierarchical relationship by building and updating a window-list data structure, which contains information about the active windows and their web-page contents. When the user requests a change to the contents of one window, the browser updates the contents of the other windows to maintain the parent-child hierarchical relationship. In this way, the browser provides contextual information for a displayed web-page.

39 Claims, 36 Drawing Sheets

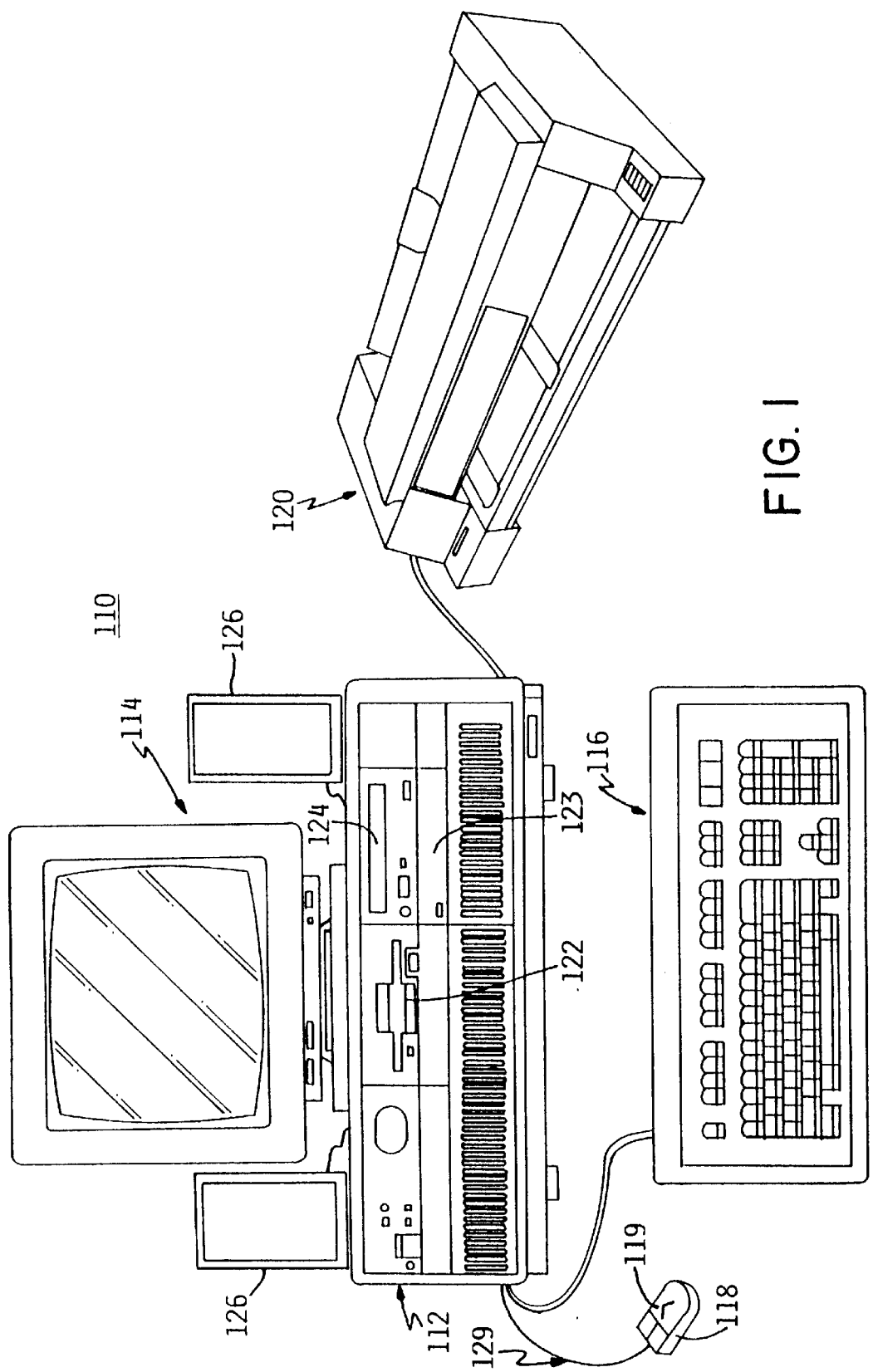

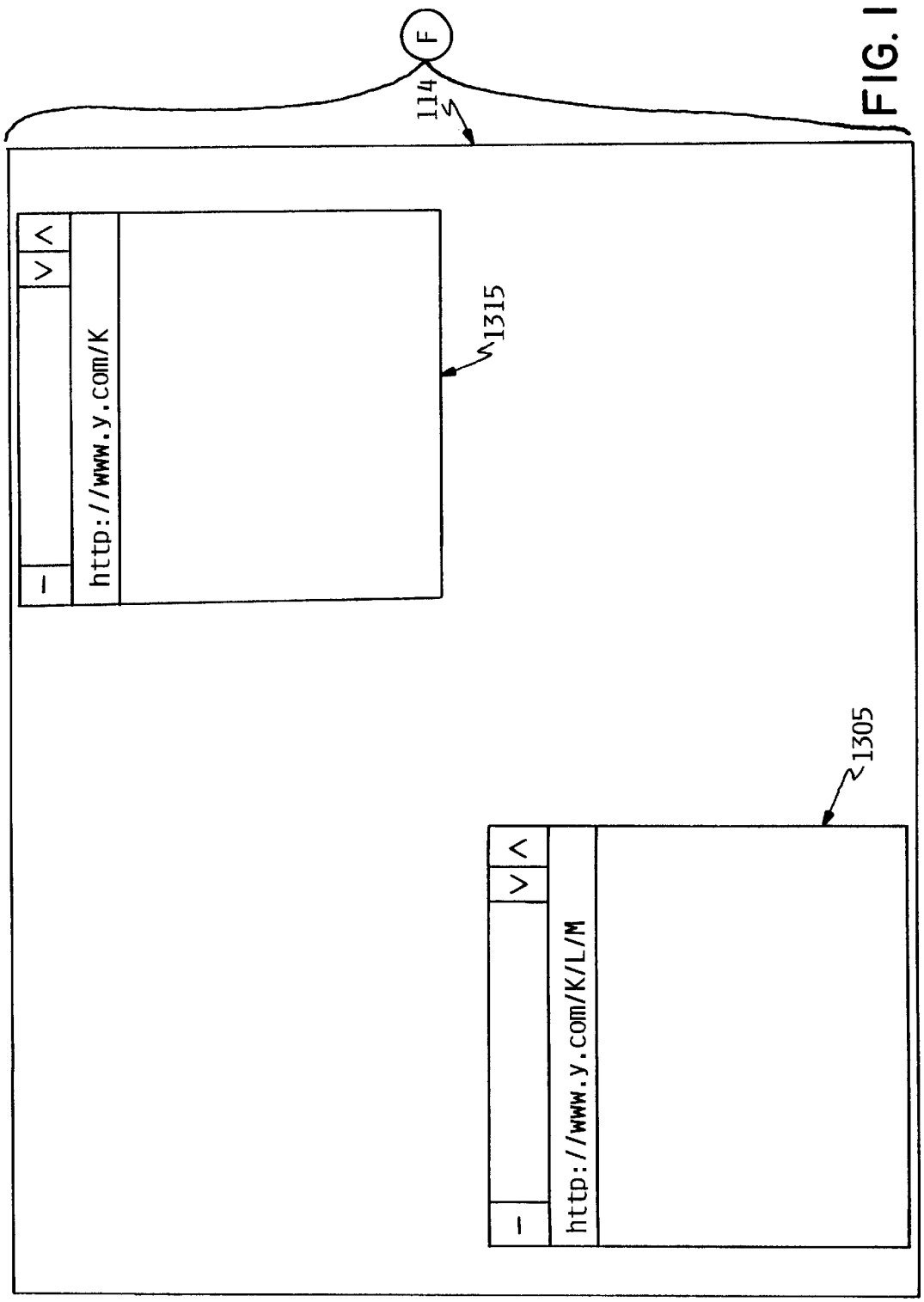

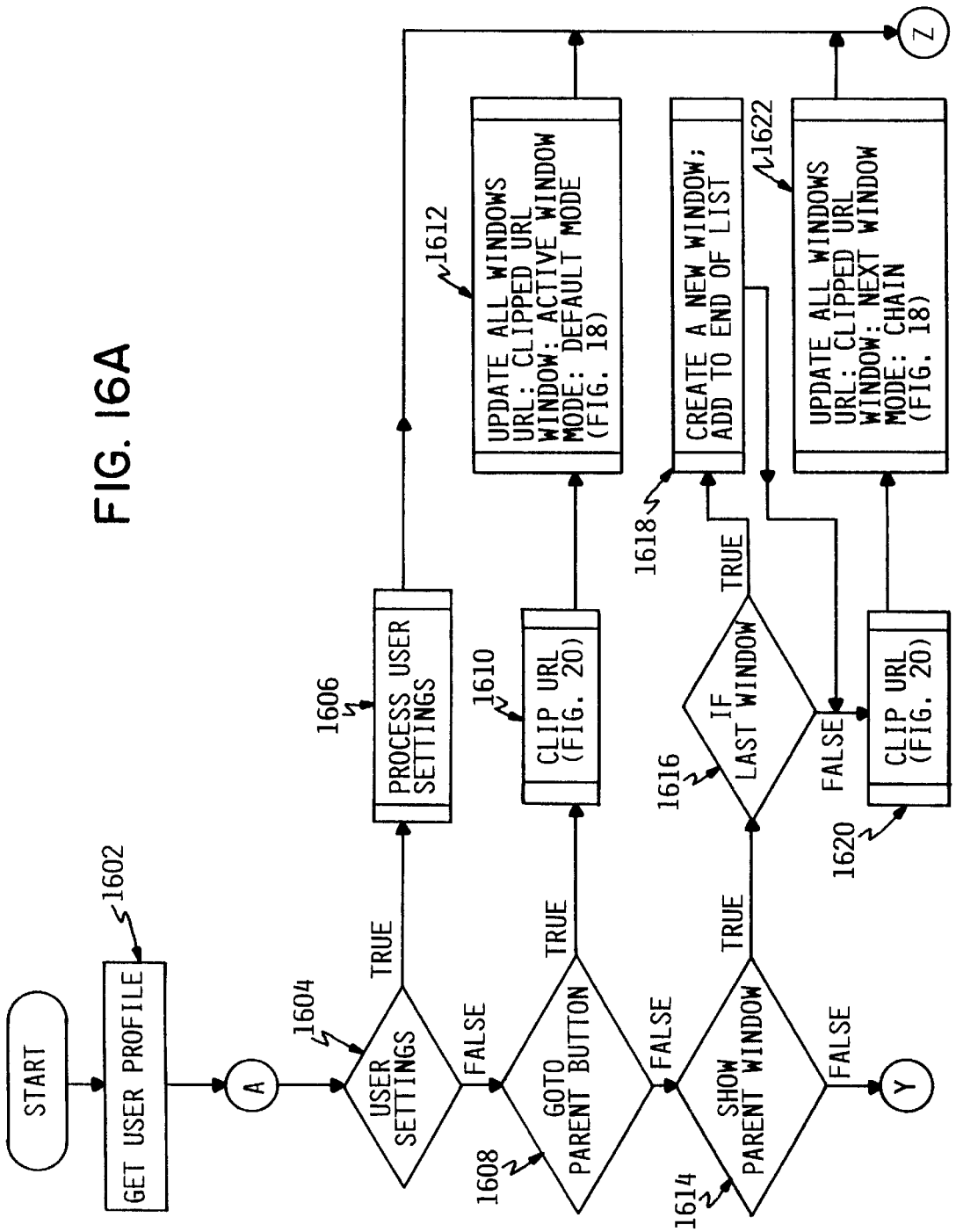

BROWSER HIERARCHICAL CONTEXTUAL INFORMATION FOR WEB PAGES

FIELD OF THE INVENTION

The present invention relates in general to improved information processing systems. In particular, the present invention relates to a method and system for hierarchical link services in a browser.

BACKGROUND

The development of distributed, computer networks, such as the Internet, allows users to retrieve vast amounts of electronic information previously unavailable. The Internet increasingly is displacing more conventional means of information transmission, such as newspapers, magazines, and even television.

Electronic information transferred between computer networks (e.g., the Internet) can be is presented to a user in hypertext, a metaphor for presenting information in a manner in which text, images, sounds, and actions become linked together in a complex, non-sequential web of associations that permit the user to "browse" through related topics, regardless of the presented order of the topics. For example, traveling among links to the word "iron" in an article might lead the user to the periodic table of the chemical elements, or to a reference to the use of iron in weapons in Europe in the Dark Ages. The term "hypertext" is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked computers utilizing hypertext conventions typically follow a client/server architecture. A "client" is usually a computer that requests a service provided by another computer (i.e., a server). A "server" is typically a remote computer system accessible over the network. Based upon such requests by the user at the client, the server presents information to the user as responses to the client. The client typically contains a program, called a browser, that communicates the requests to the server and formats the responses for viewing (browsing) at the client. The browser retrieves a web page from the server and displays it to the user at the client.

A "web page" (also referred to as a "page") is a data file, or document, written in a hyper-text language that may have hyperlinks, text, graphic images, and even multimedia objects, such as sound recordings or video clips, associated with that data file. A hyperlink is a link to a web page. The hyperlink is often presented to the user as a button in a web page, which the user may select, which causes the browser to retrieve the linked web-page.

Unfortunately, all of these web pages connected by hyperlinks are unorganized, and there is no table-of-contents. Thus, it can be very difficult for a user to determine the context of a web page, especially when the user has jumped to the web page from a search engine. The web page, its child pages, and its ancestor pages form a hierarchical structure and give context to the web page. Thus, the context of a web page is the relationship of the web page to its child and ancestor pages. Sometimes a web page will contain hyperlinks that point to the child and ancestor pages, but sometimes the page contains no such hyperlinks. It is cumbersome for the user to leave the current web-page in attempt to locate its ancestor pages, especially when the web page contains no hyperlinks that point to the ancestor pages.

Thus, there is a need for a mechanism that provides contextual information for a displayed web-page.

SUMMARY OF THE INVENTION

The invention is a mechanism for providing contextual information for a web page. In the preferred embodiment, a browser displays multiple web pages in multiple windows in a parent-child hierarchy on a display screen. The browser maintains this hierarchical relationship by building and updating a window-list data structure, which contains information about the active windows and their web-page contents. When the user requests a change to the contents of one window, the browser updates the contents of the other windows to maintain the parent-child hierarchical relationship. In this way, the browser provides contextual information for a displayed web-page.

BRIEF DESCRIPTION OF THE DRAWINGS

FIG. 9b is a pictorial representation of the display of the contents of the primary datastructure shown in FIG. 9a.

DESCRIPTION OF THE PREFERRED EMBODIMENT

Technology Overview

Figure 2:
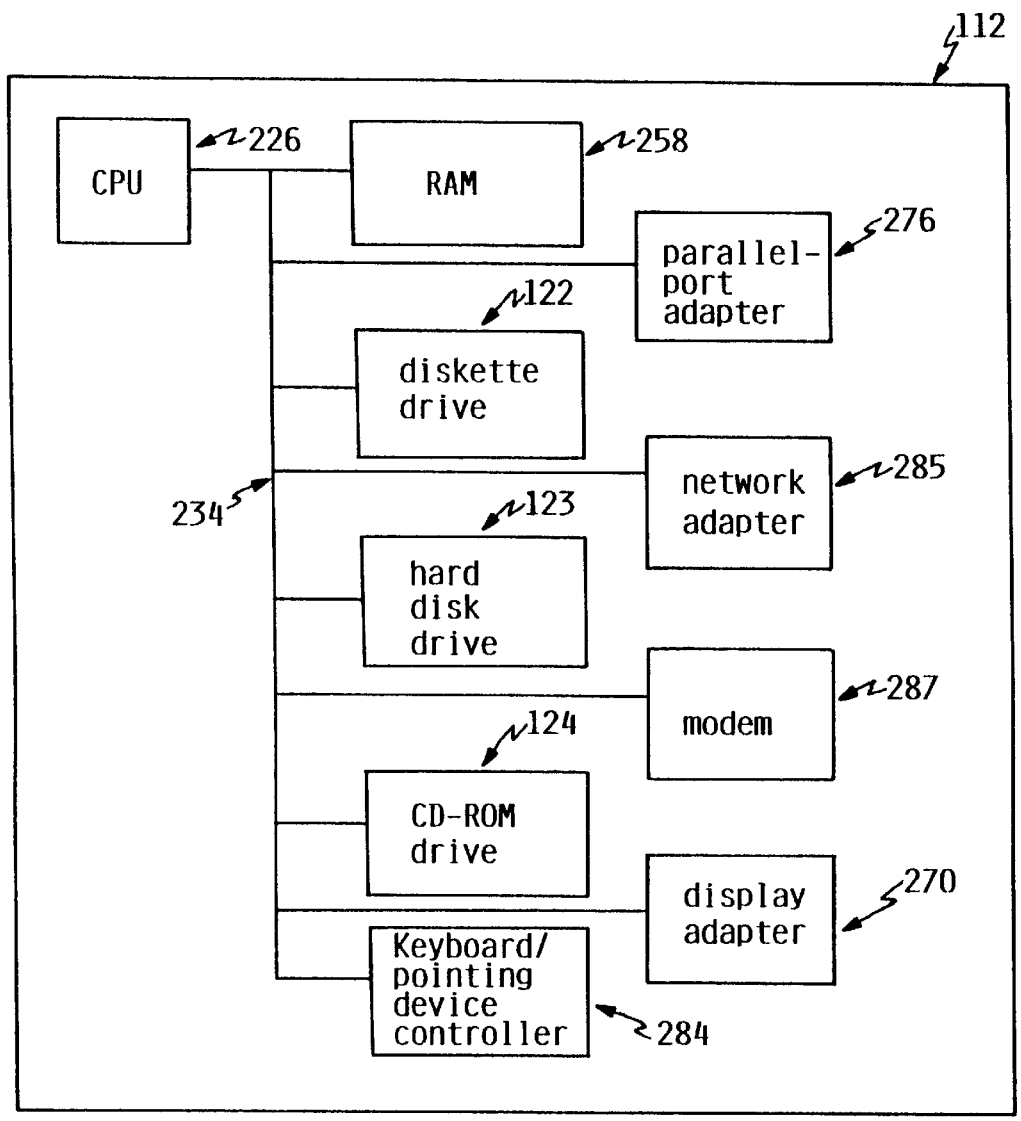
FIG. 2 is a block diagram of a representative hardware environment of the processing unit of the computer system illustrated in FIG. 1.

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a computer system might lead the user to the periodic table of the chemical elements, or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the service itself. In networked systems, a client is usually a computer that accesses shared network resources provided by another computer (i.e., a server).

A server is typically a remote computer-system accessible over a communications medium such as the Internet. The server scans and searches for information sources. Based upon such requests by the user, the server presents filtered, electronic information to the user as server responses to the client process. The client process may be active in a first computer-system, and the server process may be active in a second computer-system; the processes communicate with one another over a communications medium that allows multiple clients to take advantage of the information-gathering capabilities of the server. A server can thus be described as a network computer that runs administrative software that controls access to all or part of the network and its resources, such as data on a disk drive. A computer acting as a server makes resources available to computers acting as workstations on the network.

Client and server can communicate with one another utilizing the functionality provided by a hypertext transfer-protocol (HTTP). The World Wide Web (WWW) or, simply, the "web," includes all servers adhering to this protocol, which are accessible to clients via a Universal Resource Locator (URL) address. Internet services can be accessed by specifying Universal Resource Locators that have two basic components: a protocol to be used and an object pathname. For example, the Universal Resource Locator address, "http://www.uspto.gov/web/menu/intro.html" is an address to an introduction about the U.S. Patent and Trademark Office). The URL specifies a hypertext transfer-protocol ("http") and a name ("www.uspto.gov") of the server. The server name is associated with a unique, numeric value (i.e., a TCP/IP address). The URL also specifies the name of the file that contains the text ("intro.html") and the hierarchical directory ("web") and subdirectory ("menu") structure in which the file resides on the server. A directory is a grouping of files on the server that usually contain related information. A subdirectory is a division within a directory. A URL might contain any number of directories and subdirectories. The delimiter that separates the various identifier-components of the URL is a "/". The most-narrow identifier in the hierarchical pathname is the filename, "intro.html". The most-broad identifier in the pathname is the server name, "www.uspto.gov".

Active within the client is a first process, known as a "browser" that establishes the connection with the server, sends HTTP requests to the server, receives HTTP responses from the server, and presents information to the user. The server itself executes corresponding server software that presents information to the client in the form of HTTP responses. The HTTP responses correspond to "web pages" constructed from a Hypertext Markup Language (HTML), or other server-generated data.

The browser retrieves a web page from the server and displays it to the user at the client. A "web page" (also referred to as a "page" or a "document") is a data file written in a hyper-text language, such as HTML, that may have text, graphic images, and even multimedia objects, such as sound recordings or moving video clips associated with that data file. The page contains control tags and data. The control tags identify the structure: for example, the headings, subheadings, paragraphs, lists, and embedding of images. The data consists of the contents, such as text or multimedia, that will be displayed or played to the user. A browser interprets the control tags and formats the data according to the structure specified by the control tags to create a viewable object that the browser displays, plays, or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, and video objects. A web page can be constructed by loading one or more separate files into an active directory or file structure that is then displayed as a viewable object within a graphical user interface. A hyperlink is a link to a web page. The hyperlink is often presented to the user as a button in a web page, which the user may select, which causes the browser to retrieve the linked web-page.

Detailed Description

In the preferred embodiment, a browser displays multiple web pages in multiple windows in a parent-child hierarchy on a display screen. The browser maintains this hierarchical relationship by building and updating a window-list data structure, which contains information about the active windows and their web-page contents. When the user requests a change to the contents of one window, the browser updates the contents of the other windows to maintain the parent-child hierarchical relationship. In this way, the browser provides contextual information for a displayed web-page.

Figures 1, 13A:
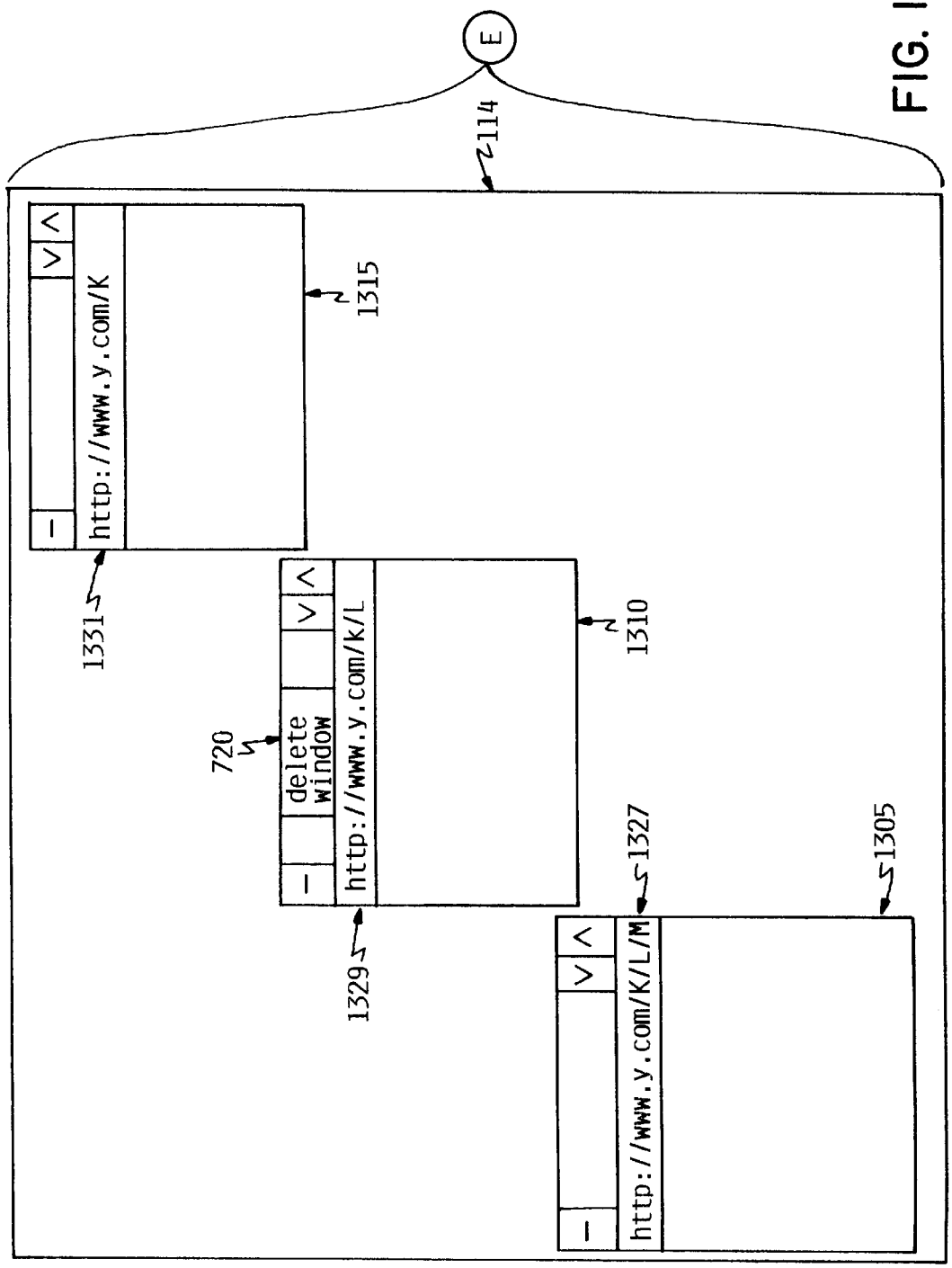
FIG. 1 is a pictorial representation of a computer system that may be utilized to implement a preferred embodiment.
Figures 2, 13A:
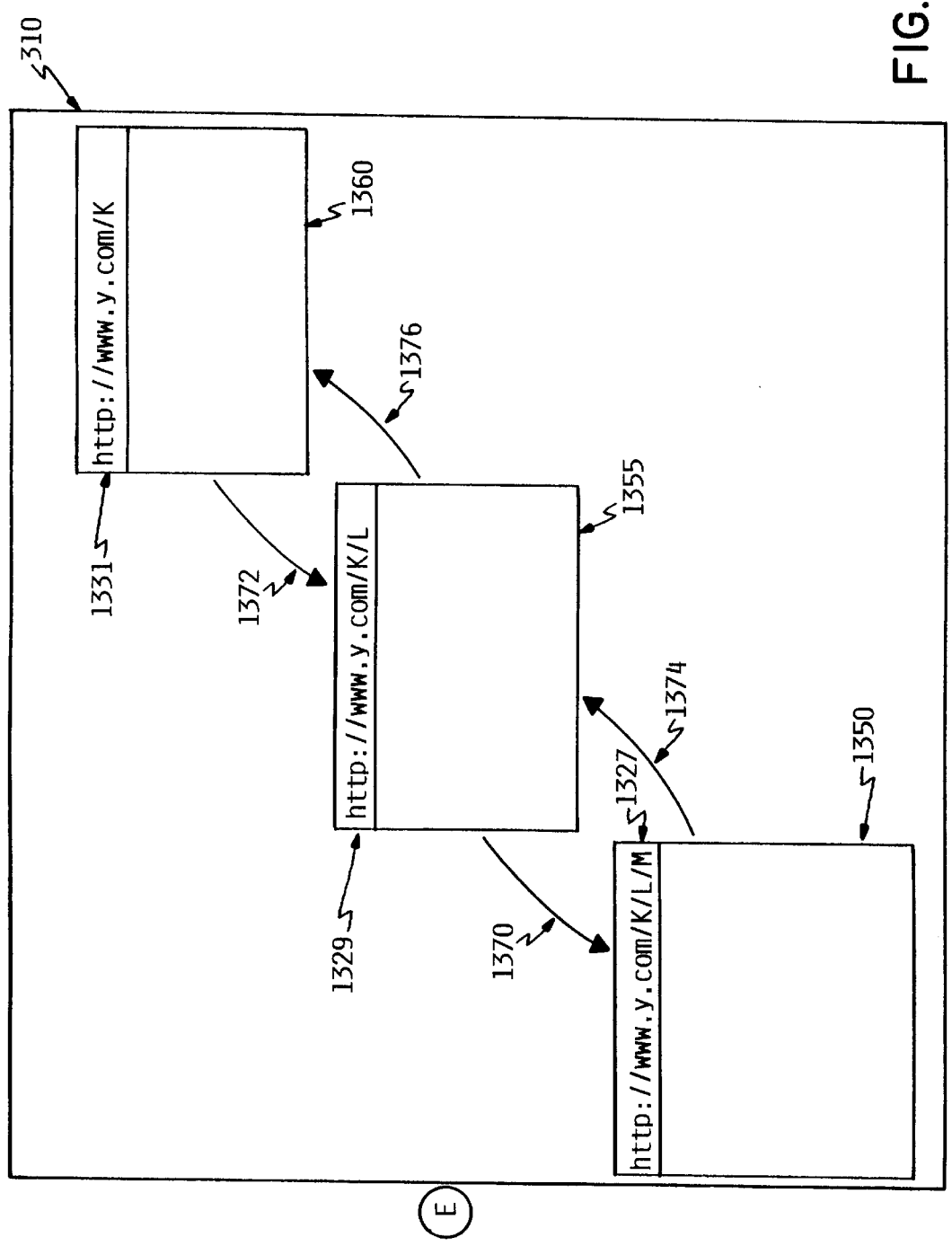

With reference now to the figures and in particular with reference to FIG. 1, there is depicted an embodiment of a computer system that may be utilized to implement the preferred embodiment. Computer system 110 includes processing unit 112, display device 114, keyboard 116, pointing device 118, printer 120, and speakers 126. Processing unit 112 receives input data from input devices such as keyboard 116, pointing device 118, and local area network interfaces (not illustrated) and presents output data to a user via display device 114, printer 120, and speakers 126.

Keyboard 116 is that part of computer system 110 that resembles a typewriter keyboard and that enables a user to control particular aspects of the computer. Because information flows in one direction, from keyboard 114 to processing unit 112, keyboard 116 functions as an input-only device. Functionally, keyboard 116 represents half of a complete input/output device, the output half being video display 114. Keyboard 116 includes a standard set of printable characters presented in a QWERTY pattern typical of most typewriters. In addition, keyboard 116 includes a calculator-like numeric keypad at one side. Some of these keys, such as the "control," "alt," and "shift" keys can be utilized to change the meaning of another key. Other special keys and combinations of keys can be utilized to control program operations or to move either text or cursor on the display screen of video display terminal 114.

Video display 114 is the visual output of computer system 110. As indicated herein, video display 114 can be a cathode-ray tube (CRT) based video display well-known in the art of computer hardware. But, with a portable or notebook-based computer, video display 114 can be replaced with a liquid crystal display (LCD) based or gas, plasma-based, flat-panel display.

Pointing device 118 features a casing with a flat bottom that can be gripped by a human hand. Pointing device 118 can include buttons on the top, a multidirectional detection device such as a ball on the bottom, and a cable 129 that connects pointing device 118 to processing unit 112. Pointing device 118 contains scroll wheel 119. Scroll wheel 119 is a wheel that can be rotated by the user. When interpreted by the operating system, the user can utilize scroll wheel 119 to perform a variety of functions, most typically controlling the scroll bar of the active window. Pointing device 118 is preferably utilized in conjunction with a graphical user interface (GUI) in which hardware components and software objects are controlled through the selection and the manipulation of associated graphical objects displayed within display device 114. Although computer system 110 is illustrated with a mouse for pointing device 118, other graphical-pointing devices such as a graphic tablet, joystick, track ball, or track pad could also be utilized.

To support storage and retrieval of data, processing unit 112 further includes diskette drive 122, hard-disk drive 123, and CD-ROM drive 124, which are interconnected with other components of processing unit 112.

Computer system 110 can be implemented utilizing any suitable computer such as the IBM Aptiva computer, a product of International Business Machines Corporation, located in Armonk, N.Y. But, a preferred embodiment of the present invention can apply to any hardware configuration that allows browsing of documents, regardless of whether the computer system is a complicated, multi-user computing apparatus, a single-user workstation, or a network appliance that does not have non-volatile storage of its own.

Referring to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes central processing unit (CPU) 226, which executes instructions. CPU 226 controls the operation of the entire computer system, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented as one of the 80×86 or Pentium processors, or any other type of processor, which are available from a number of vendors. Although computer system 110 is shown to contain only a single CPU and a single system bus, the present invention applies equally to computer systems that have multiple CPUs and to computer systems that have multiple buses that each perform different functions in different ways.

RAM 258 comprises a number of individual volatile memory modules that store segments of operating system and application software while power is supplied to computer system 110. The software segments are partitioned into one or more virtual-memory pages that each contain a uniform number of virtual memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without having to start from the beginning.

Hard-disk drive 123 and diskette drive 122 are electro-mechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 110. A disk itself is typically a round, flat piece of flexible plastic (e.g., floppy disk) or inflexible metal (e.g. hard disk) coated with a magnetic material that can be electrically influenced to hold information recorded in digital form. A disk is, in most computers, the primary method for storing data on a permanent or semipermanent basis. Because the magnetic coating of the disk must be protected from damage and contamination, a floppy disk (e.g., 5.25 inch) or micro-floppy disk (e.g., 3.5 inch) is encased in a protective plastic jacket. But, any size of disk could be used. A hard disk, which is very finely machined, is typically enclosed in a rigid case and can be exposed only in a dust free environment.

Keyboard/pointing-device controller 284 interfaces processing unit 112 with keyboard 116 and graphical-pointing device 118. In an alternative embodiment, keyboard 116 and graphical-pointing device 118 have separate controllers.

Display adapter 270 translates graphics data from CPU 226 into video signals utilized to drive display device 114.

Finally, processing unit 112 includes network adapter 285, modem 287, and parallel-port adapter 276, which facilitate communication between computer system 110 and peripheral devices or other computer systems. Parallel-port adapter 276 transmits printer-control signals to printer 120 through a parallel port. Network adapter 285 connects computer system 110 to an unillustrated local area network (LAN). A LAN provides a user of computer system 110 with a means of electronically communicating information, including software, with a remote computer or a network logical-storage device. In addition, a LAN supports distributed processing, which enables computer system 110 to share a task with other computer systems linked to the LAN.

Modem 287 supports communication between computer system 110 and another computer system over a standard telephone line. Furthermore, through modem 287, computer system 110 can access other sources such as a server, an electronic bulletin board, and the Internet or World Wide Web.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (a) information permanently stored on non-writable storage media (e.g., read only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of the present invention, represent alternative embodiments of the present invention.

Figure 3:
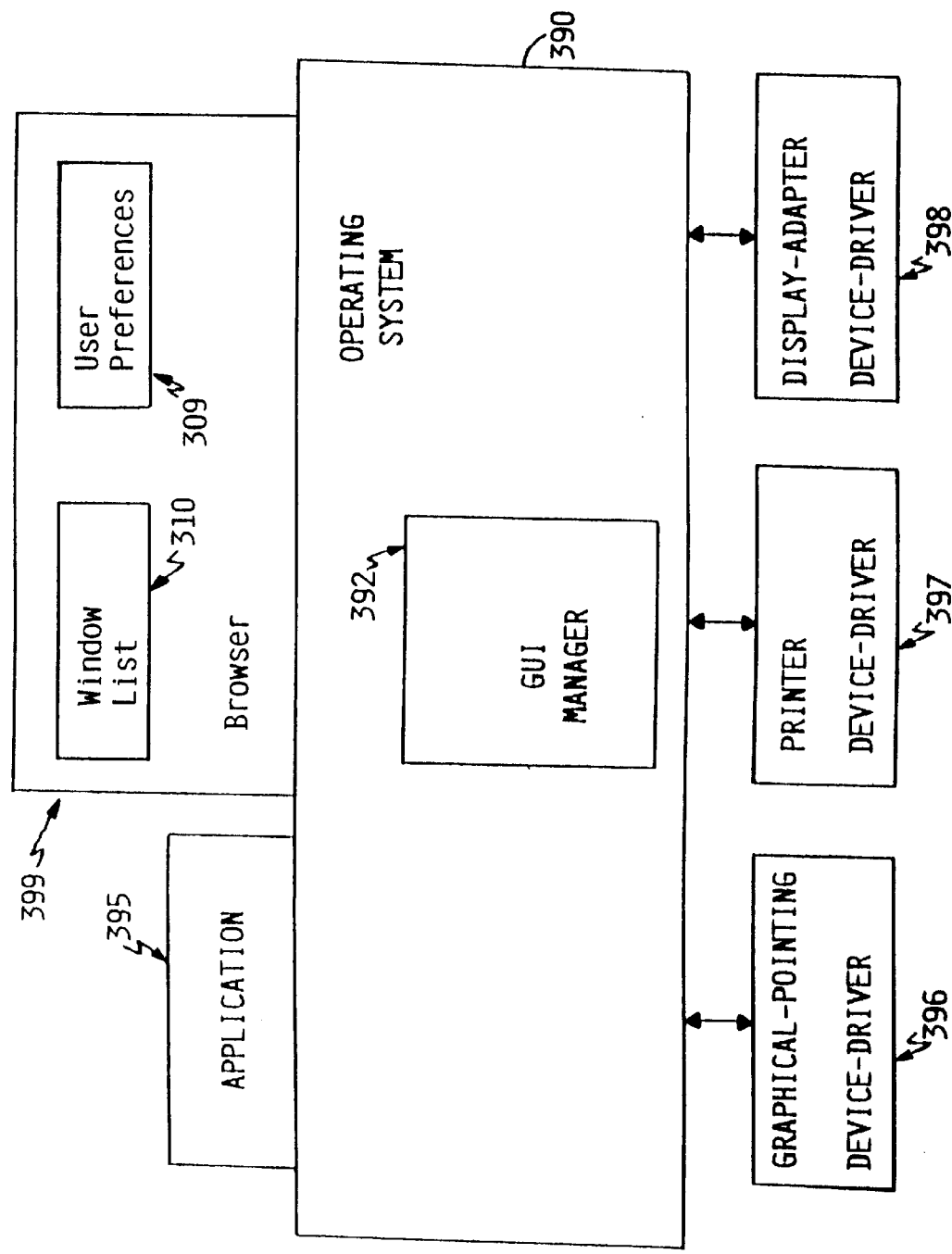
FIG. 3 is a block diagram of software stored within the memory of the computer system depicted in FIG. 1.

With reference now to FIG. 3, there is illustrated a block-diagram representation of the software configuration of computer system 110. As noted above, the software executed by computer system 110 can be stored within one or more of RAM 258, the nonvolatile storage provided by diskette drive 122, hard-disk drive 123, CD-ROM drive 124, or a remote server accessible via modem 287 or network adapter 285.

As illustrated, the software configuration of computer system 110 includes operating system 390, which is responsible for directing the operation of computer system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2 operating systems) could be used. Other technologies also could be utilized, such as touch-screen technology or human-voice control. The operating system is the foundation upon which applications 395, such word-processing, spreadsheet, and web-browser programs are built.

In accordance with the preferred embodiment, operating system 390 includes graphical-user-interface (GUI) 392 manager although they could be packaged separately. GUI 392 manages the graphical-user-interface with which a user of computer system 110 interacts.

Operating system 390 communicates with applications 395 and browser 399 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display adapter 270. In addition, graphical-pointing device-driver 396 translates signals from pointing device 118 through keyboard/pointing-device controller 284 into Cartesian coordinates and a selection status, which are then relayed to GUI manager 392. Also, operating system 390 sends printer-control codes and data to printer device-driver 397, which in turn translates the control codes and data into bus signals used to control printer 120.

CPU 226 is suitably programmed to carry out the preferred embodiment by browser 399, as described in more detail in the flowcharts of FIGS. 16–20. In the alternative, the functions of FIGS. 16–20 could be implemented by control circuitry through the use of logic gates, programmable-logic devices, or other hardware components in lieu of a processor-based system.

Figure 8:
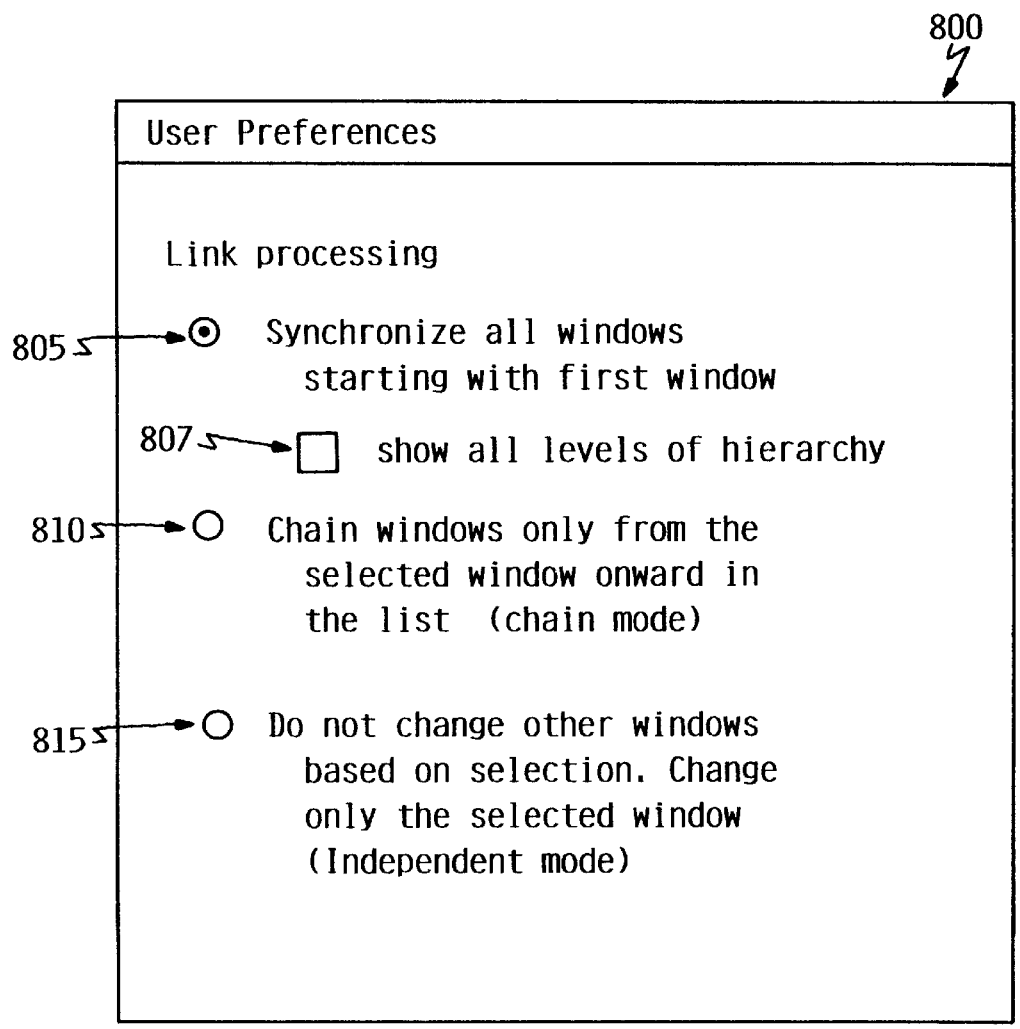

Browser 399 contains user preferences 309 and window list 310, which are further described under the description for FIGS. 8 and 9, respectively. In an alternative embodiment, user profile 309 could be packaged separately from browser 399. Although browser 399 is drawn as being separate from operating system 390, they could be packaged together.

Figure 4:
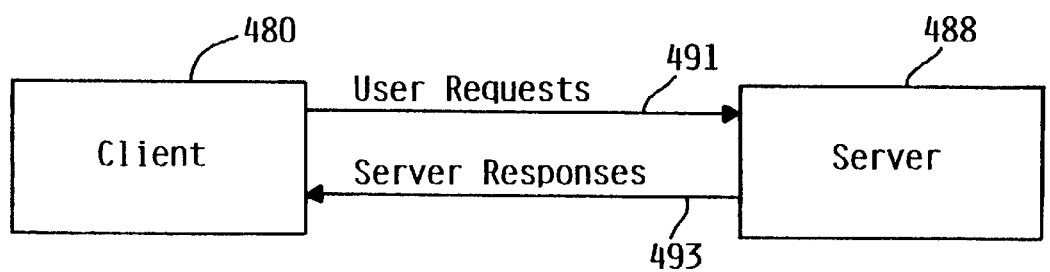
FIG. 4 is a block diagram illustrative of a client/server architecture in accordance with a preferred embodiment.

FIG. 4 is a block diagram illustrative of a client/server architecture, in accordance with a preferred embodiment. User requests 491 are sent by client process 480 to server 488. Server 488 can be a remote computer system accessible over a computerized, distributed-information resource such as the Internet or other communications network. Server 488 performs scanning and searching of information sources and, based upon these user requests, presents the filtered electronic information as server responses 493 to the client process. The client process may be active in a first computer system (such as computer system 110), and the server process may be active in a second computer system, communicating with one another over a communications medium, thus providing distributed functionality and allowing multiple clients to take advantage of the information-gathering capabilities of the server.

Figure 5:
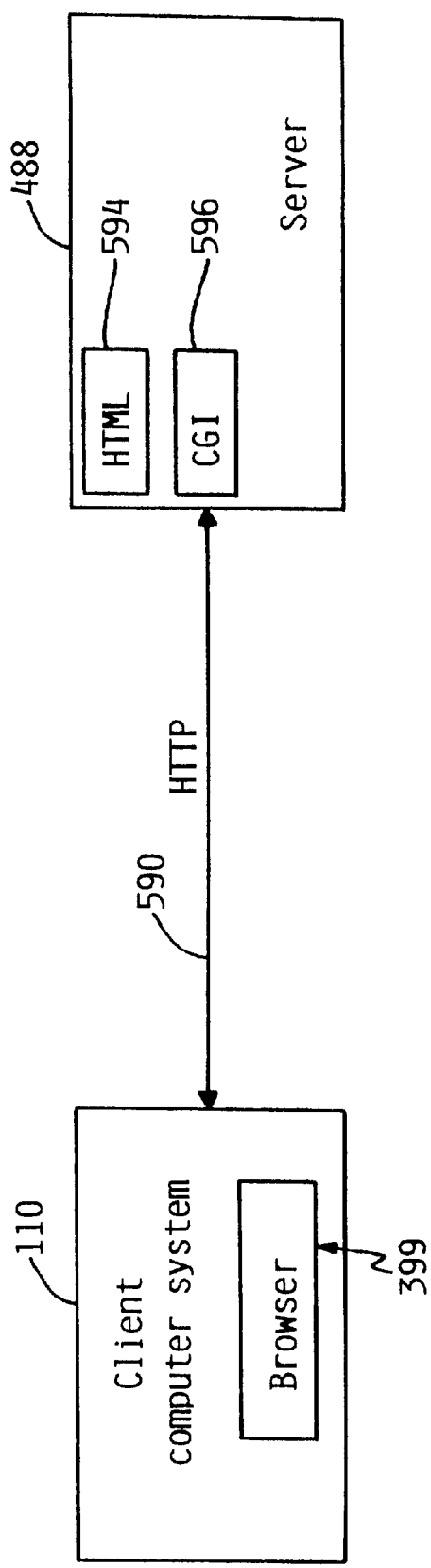
FIG. 5 is a detailed block diagram of a client/server architecture in accordance with a preferred embodiment.

FIG. 5 illustrates a detailed block-diagram of a client/server architecture in accordance with a preferred embodiment. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within client 110 is a first client process, browser 399, which establishes connections with server 488 and presents information to the user.

Server 488 executes the corresponding server software, which presents information to the client in the form of HTTP responses 590. The HTTP responses 590 correspond with the web pages represented using HTML or other data generated by server 488. Server 488 provides HTML 594. Server 488 also provides Common Gateway Interface (CGI) 596, which allows client 110 to direct server 488 to commence execution of a specified program contained within server 488. This may include a search engine that scans received information in the server for presentation to the user controlling the client. Using this interface and HTTP responses 590, server 488 may notify client 110 of the results of that execution upon completion. Although the protocols of HTML, CGI, and HTTP are shown, any suitable protocols could be used.

Figure 6:
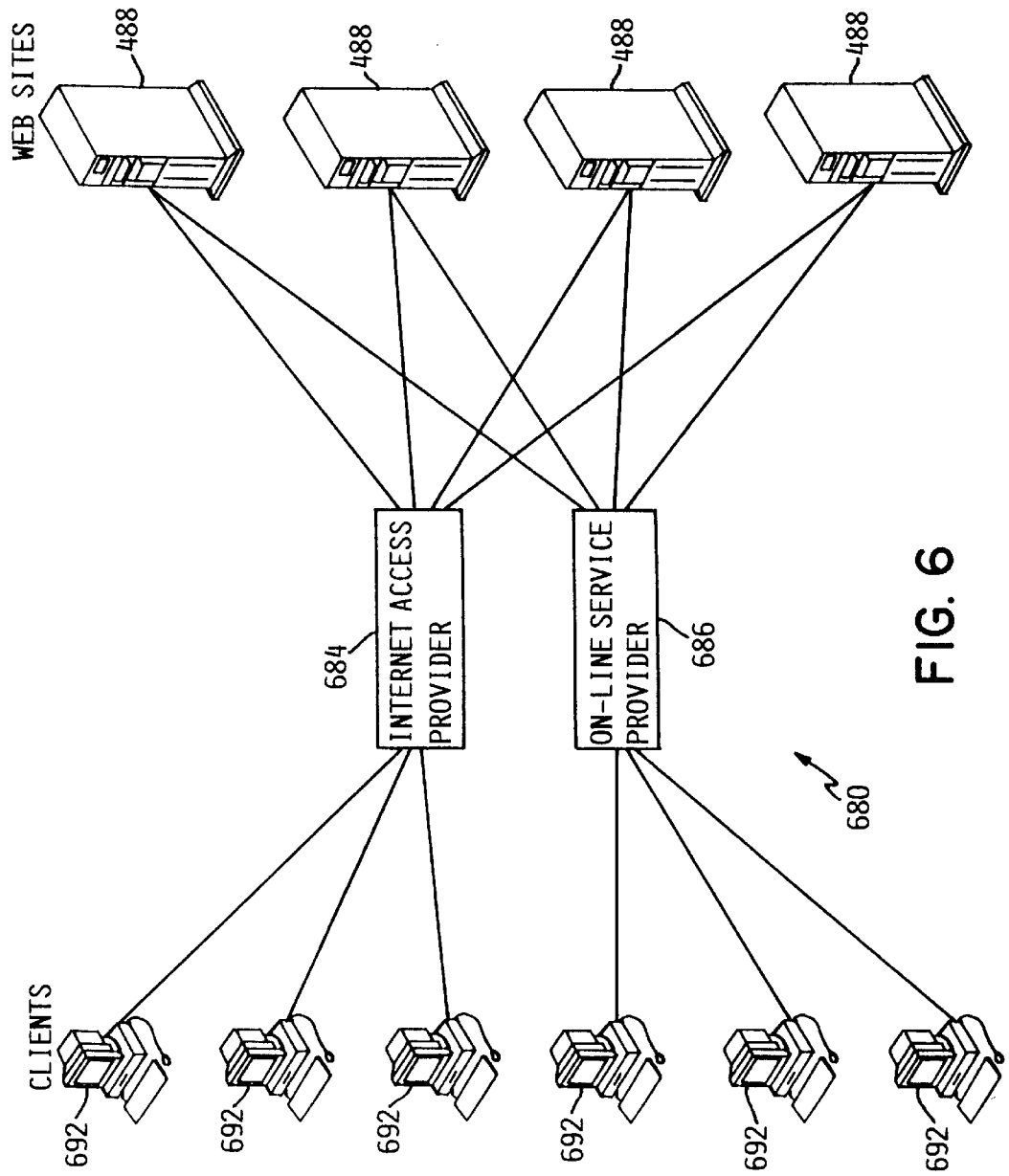
FIG. 6 is a diagram illustrative of a computer network that can be implemented in accordance with a preferred embodiment.

FIG. 6 is a diagram illustrative of a computer network 680, which can be implemented in accordance with a preferred embodiment of the present invention. Computer network 680 is representative of the Internet, which can be described as a known computer network based on the client-server model discussed herein. Conceptually, the Internet includes a large network of servers 488 that are accessible by clients 692, typically computers such as computer system 110, through some private Internet access provider 684 (e.g., Internet America) or an on-line service provider 686 (e.g., America On-Line, Prodigy, and Compuserve). Each of clients 692 may run browser 399 to access servers 488 via the access providers. Each server 488 operates a so-called "web site" that supports files in the form of documents or pages. A network path to servers 488 is identified by a Universal Resource Locator (URL) having a known syntax for defining a network connection.

Figure 7:
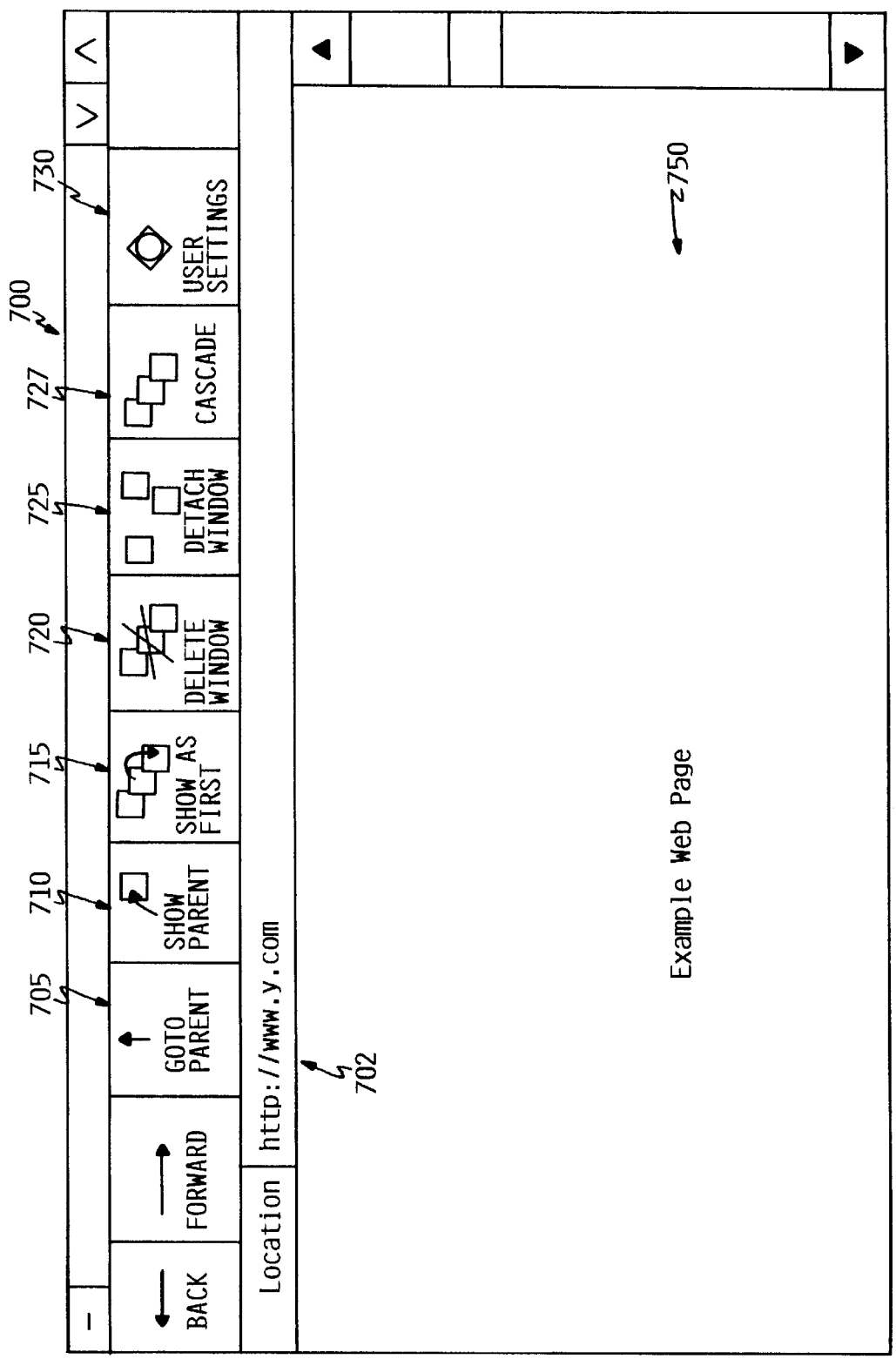
FIGS. 7 and 8 are pictorial representations of the interfaces that a user may operate to control the operation of a preferred embodiment.

FIG. 7 illustrates a pictorial representation of the interfaces that are used to control the operations of the preferred embodiment. FIG. 7 contains browser window 700, which is displayed on display screen 114. Browser window 700 contains URL 702, which is the address from which browser 399 downloaded example page-contents 750 from a server. In this example, URL 702 is the fictitious web site address "http://www.y.com". Browser window 700 also contains go-to-parent button 705, show-parent button 710, show-as-first button 715, delete-window button 720, detach-window button 725, cascade button 727, and user-settings button 730.

Go-to-parent button 705 allows the user to request that browser 399 display the parent web-page of the web page identified by URL 702 in browser window 700. Browser 399 will update the first or active window to contain the parent web-page, depending on the settings specified in user preferences 309. Also, browser 399 will update subsequent, linked windows depending on the settings specified in user preferences 309. The operation of browser 399 in response to go-to-parent button 705 is further described below under the description for FIGS. 10a and 10b.

Referring again to FIG. 7, show-parent button 710 allows the user to request that browser 399 display the parent web-page of the web page identified by URL 702 in a new window. Browser 399 will also update subsequent, linked windows depending on the settings specified in user preferences 309. The operation of browser 399 in response to show-parent button 710 is further described below under the description for FIGS. 11a and 11b.

Referring again to FIG. 7, show-as-first button 715 allows the user to specify that browser 399 should move active browser-window 700 to be the first window in window list 310 and synchronize all of the windows. Thus, browser 399 will use synchronize mode in updating the linked windows, regardless of the mode specified by the user in dialog 800. The operation of browser 399 in response to show-as-first button 715 is further described below under the description for FIGS. 12a and 12b.

Referring again to FIG. 7, delete-window button 720 gives the user the opportunity to specify that browser 399 should close browser window 700 and remove it from window list 310. The operation of browser 399 in response to delete-window button 720 is further described below under the description for FIGS. 13a and 13b.

Referring again to FIG. 7, detach-window button 725 gives the user the opportunity to specify that browser 399 should remove window 700 from window list 310, but browser window 700 remains visible on display screen 114. The operation of browser 399 in response to detach-window button 725 is further described below under the description for FIGS. 14a and 14b.

Referring again to FIG. 7, cascade button 727 gives the user the opportunity to specify that browser 399 should display window list 310 in a cascading format, as further described below under the description for FIGS. 15a and 15b.

Referring again to FIG. 7, user settings button 730 causes browser 399 to present the dialog, as described below under the description for FIG. 8.

FIG. 8 illustrates a pictorial representation of the interfaces presented by browser 399 when the user selected modify user-settings 730, as described above under the description for FIG. 7. Referring again to FIG. 8, browser 399 has displayed the fields in user preferences 309 that are available for the user to modify. These fields include synchronize mode 805, show-all-levels-of-hierarchy 807, chain mode 810, and independent mode 815.

Synchronize mode 805 gives the user the opportunity to specify that during link processing all windows will be synchronized starting with the first window. Thus, the selection of reference numeral 805 causes browser 399 to operate in "synchronize" mode. Show-all-levels-of hierarchy 807 gives the user the opportunity to specify that browser 399 should display all levels of window hierarchy during link processing. Reference numeral 810 gives the user the opportunity to specify that during link processing, browser 399 will chain windows only from the user-selected window onward in the list. Thus, the selection of reference numeral 810 causes browser 399 to operate in "chain" mode. Reference numeral 815 gives the user the opportunity to specify that during link processing, browser 399 will change only the user-selected window. Thus, the selection of reference numeral 815 causes browser 399 to execute in "independent" mode.

Figure 9A:
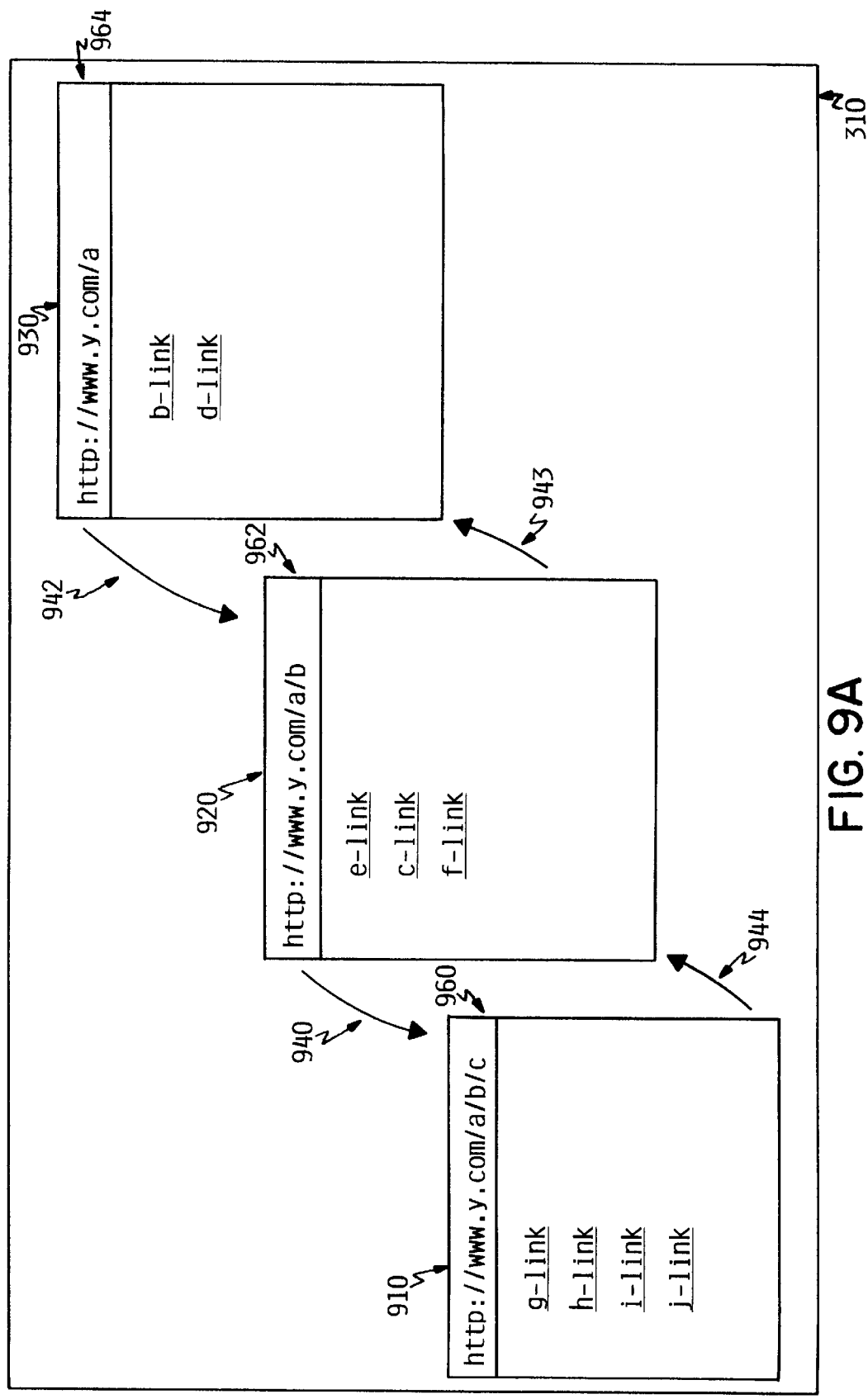
FIG. 9a is a pictorial representation of example contents of a primary data-structure, according to the preferred embodiment.

FIG. 9a is a block diagram of example contents of window list 310. Window-list elements 910, 920, and 930 are shown. For the purposes of illustration, window-list elements 910, 920, and 930 are drawn as windows, but the contents of window list 310 would preferably be a data structure containing addresses and data. Window list 310 and its elements represent the parent-child hierarchy of the windows displayed on display screen 114. The elements in window list 310 are linked to each other in a linked list having forward and backward pointers 940, 942, 943, and 944. Although in this example, three window-list elements are shown, there could be any number of window-list elements. Window-list element 930 represents the web page having URL 960 with example, fictitious contents "http://www.y.com/a". Window-list element 920 represents a fictitious web-page having URL 962 with example, fictitious contents "http://www.y.com/a/b". Window-list element 910 represents a fictitious web-page having URL 964 with example, fictitious contents "http://www.y.com/a/b/c". Window-list element 920 is the parent of window-list element 910 and window-list element 930 is the parent of window-list element 920. Similarly, window-list element 910 is the child of window-list element 920, and window-list element 920 is the child of window-list element 930. The web-page associated with window-list element 930 contains the hyperlinks "b-link" and "d-link". The web page associated with window-list element 920 contains the hyperlinks "e-link", "c-link", and "f-link". The web page associated with window-list element 910 contains the hyperlinks "g-link", "h-link", "i-link", and "j-link". Browser 399 constructs the elements in window-list 310 and is further described below under the description for FIGS. 16–20.

Figure 9B:
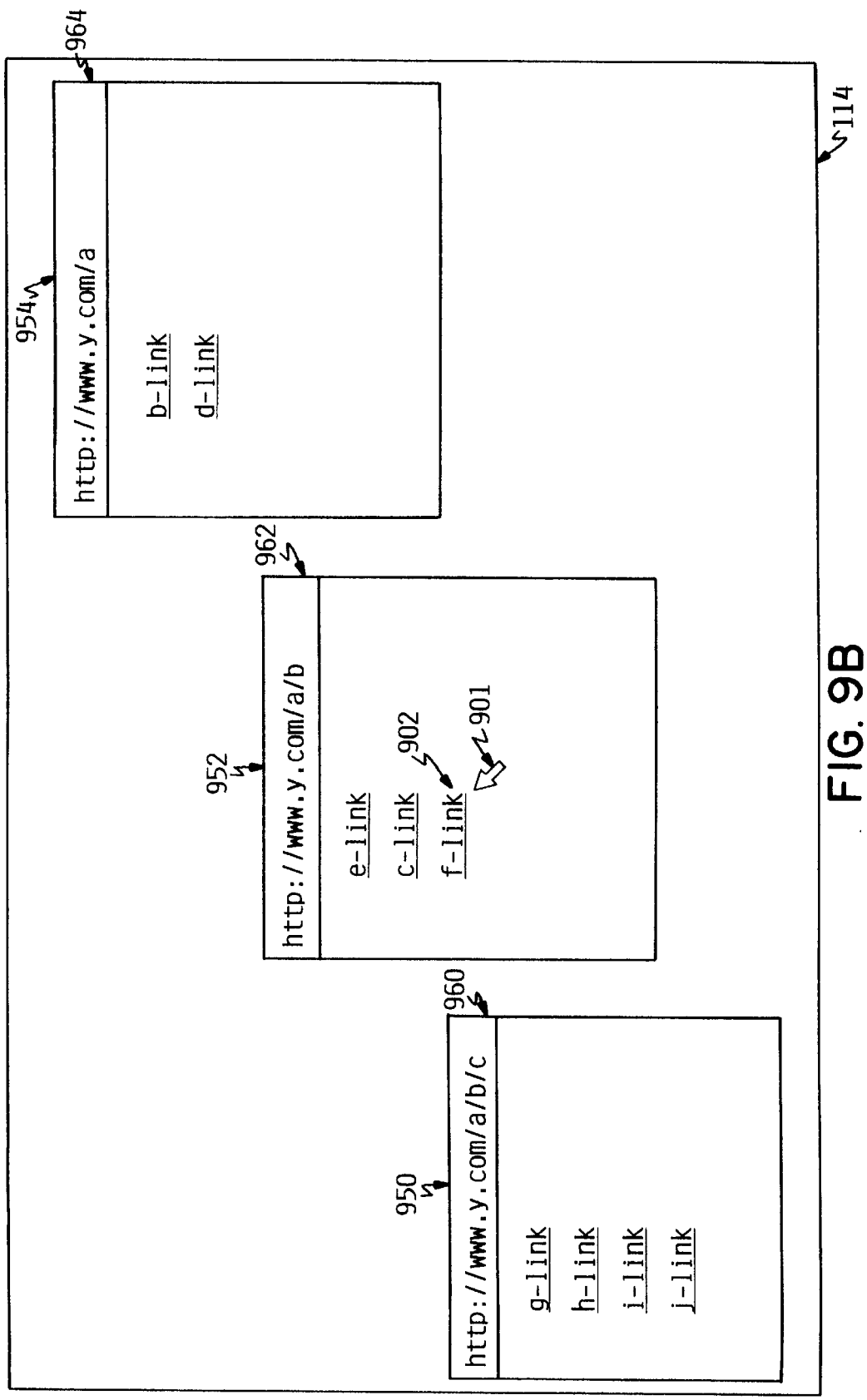

FIG. 9b is a pictorial representation of the display of the contents of window list 310 shown in FIG. 9a. Referring again to FIG. 9b, windows 950, 952, and 954 are displayed on display screen 114. Window 950 corresponds to window-list element 910, window 952 corresponds to window-list element 920, and window 954 corresponds to window-list element 930. Window 950 displays the contents of the page at URL 960, window 952 displays the contents of the page at URL 962, and window 954 displays the contents of the page at URL 964. The user can use pointer 901 to select a hyperlink, such as hyperlink 902, having the displayed text: "f-link".

Figure 9C:
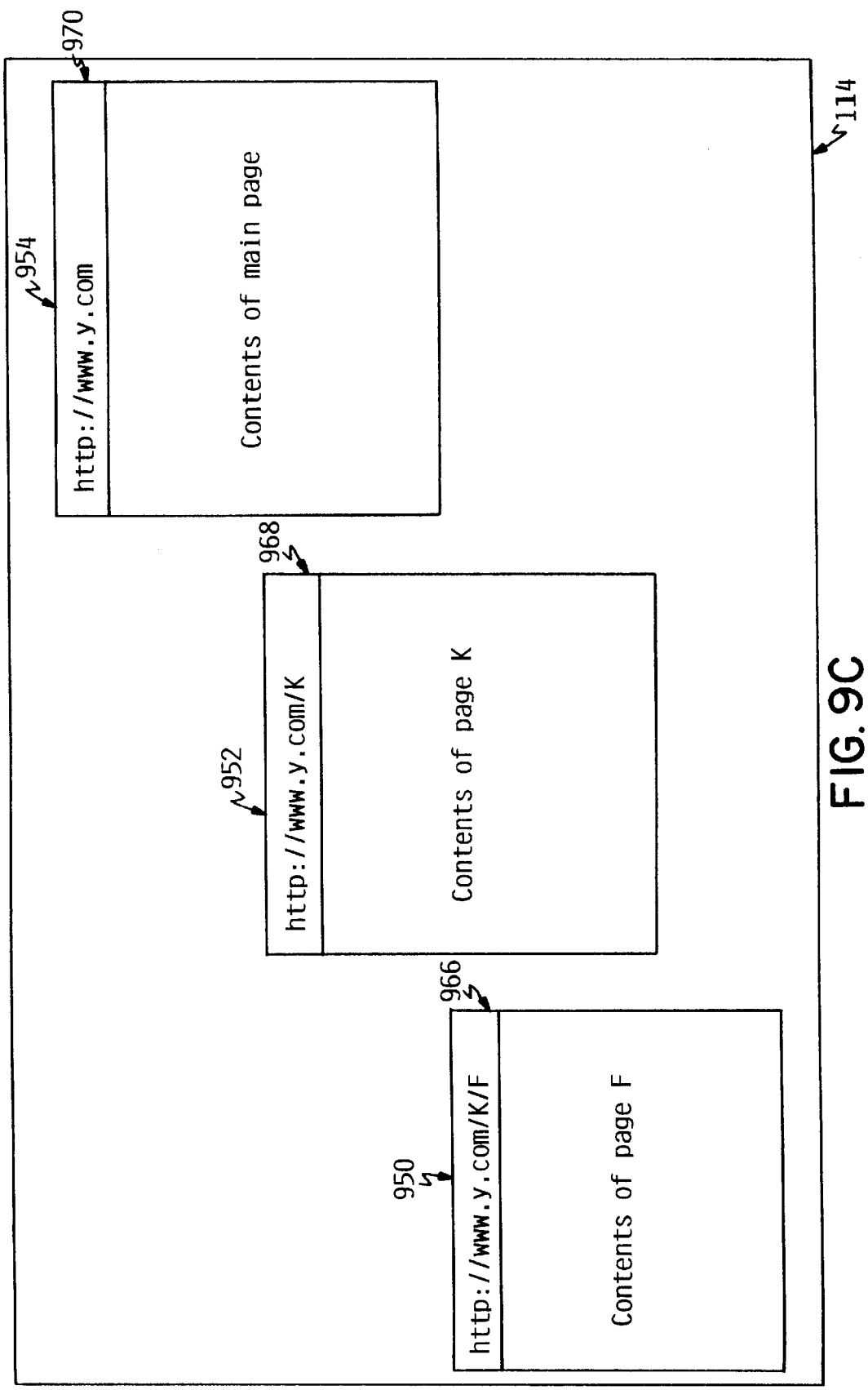
FIGS. 9c, 9d, 10a, 10b, 11a, 11b, 12a, 12b, 13a, 13b, 14a, 14b, 15a, and 15b show pictorial representations of example operations, according to the preferred embodiment.

FIG. 9c is a pictorial representation of the display of the contents of window-list 310 by browser 399 after the user has selected synchronize mode 805 (shown in FIG. 8) and link 902 (shown in FIG. 9a). Referring again to FIG. 9c, in response to the user selecting f-link 902, browser 399 has determined that the URL associated with f-link 902 is URL 966, having the example, fictitious contents "http://www.y.com/k/f". Browser 399 has displayed URL 966 in window 950, which is the first window in window list 310. Browser 399 also retrieved the contents of the page at URL 966 and displayed it in window 950 as "contents of page F". Browser 399 then found the parent of URL 966 by deleting the most-narrow identifier in the hierarchy of the address of URL, which in this case is "F" and the delimiter "/". This operation yielded URL 968, having the example, fictitious contents "http://www.y.com/k", which browser 399 displayed in window 952. Browser 399 then retrieved the contents of the page associated with URL 968 and displayed it in window 952 as "contents of page K". Browser 399 then determined the parent of URL 968 by deleting the most-narrow identifier in URL 968, which in this example is "K" and the delimiter "/". This operation yielded URL 970, which browser 399 displayed in window 954 as the example, fictitious URL "http://www.y.com". Browser 399 then retrieved the page associated with URL 970, which in this example has the contents "contents of main page". Browser 399 also updates the contents of window list 310 to correspond to the display in FIG. 9c.

Figure 9D:
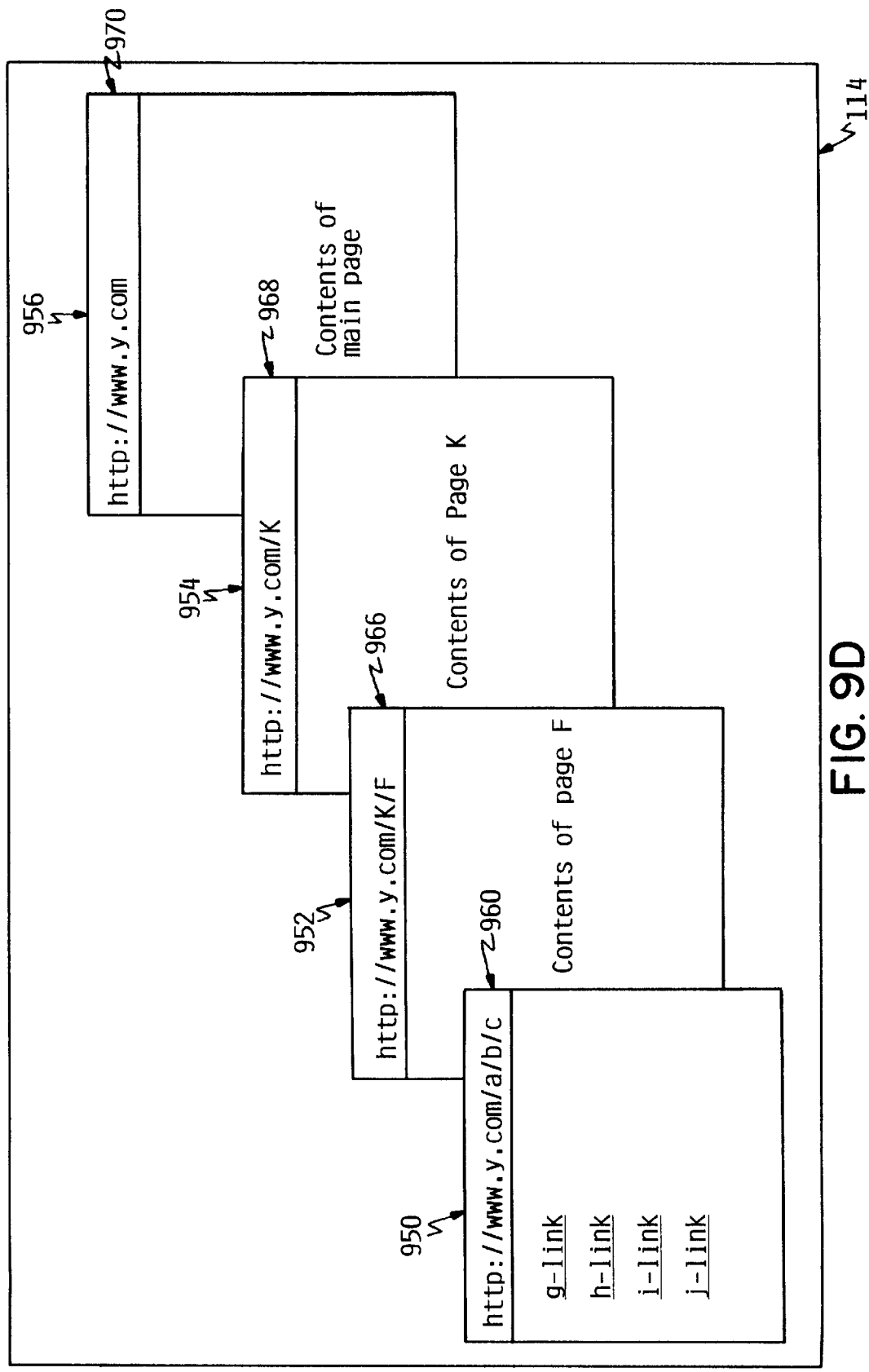

FIG. 9d is a pictorial representation of the display of the contents of window list 310 by browser 399 after the user has selected chain mode 810 (shown in FIG. 8) and link 902 (shown in FIG. 9a). Referring again to FIG. 9c, in response to the user selecting link 902, browser 399 finds the URL associated with link 902, which in this example is URL 966. Since the user has selected chain mode 810, browser 399 displays URL 966 in the active window, which is window 952. Browser 399 leaves window 950 unmodified from FIG. 9b. Referring again to FIG. 9d, browser 399 then retrieves the page associated with URL 966, which has contents "contents of page F". Browser 399 then determines the parent of URL 966 by deleting the most-narrow identifier in URL 966, which is "F" and the delimiter "/", which yields URL 968 having the example, fictitious contents "http://www.y.com/k". Browser 399 displays URL 968 in window 954 and retrieves the page associated with URL 968 and displays it in window 954. The page associated with URL 968 has example, fictitious contents "contents of page K". Browser 399 then determines the parent URL of URL 968 by deleting the most-narrow identifier in URL 968, which in this example is "K" and the delimiter "/", which yields URL 970 having the example, fictitious contents "http://www.y.com". Browser 399 displays URL 970 in new window 956. Browser 399 then retrieves the contents of the page associated with URL 970, which in this example is "contents of main page", and displays it in window 956. Browser 399 also updates the contents of window-list 310 to correspond to the display in FIG. 9c.

Figure 10A:
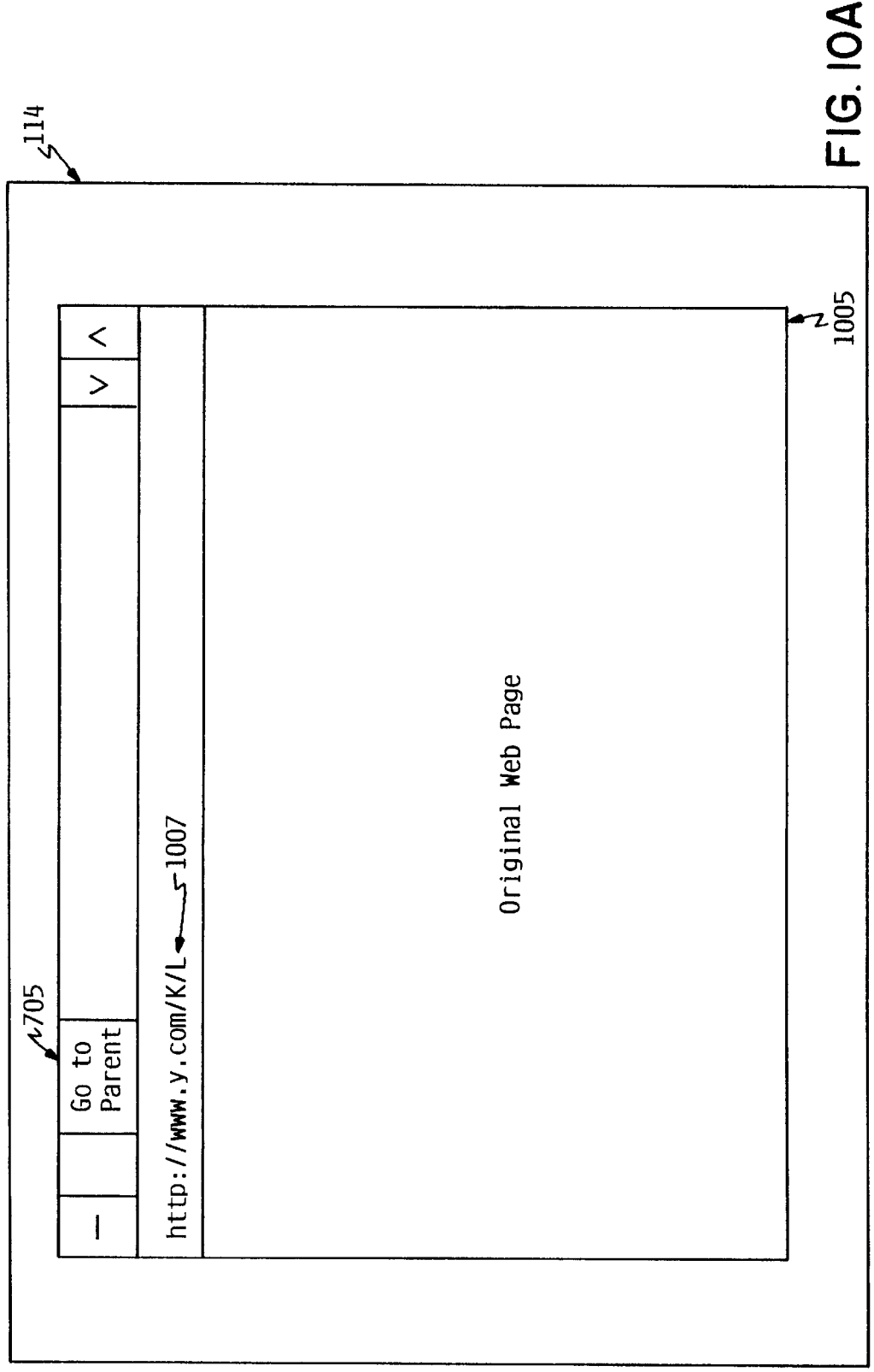
Figure 10B:
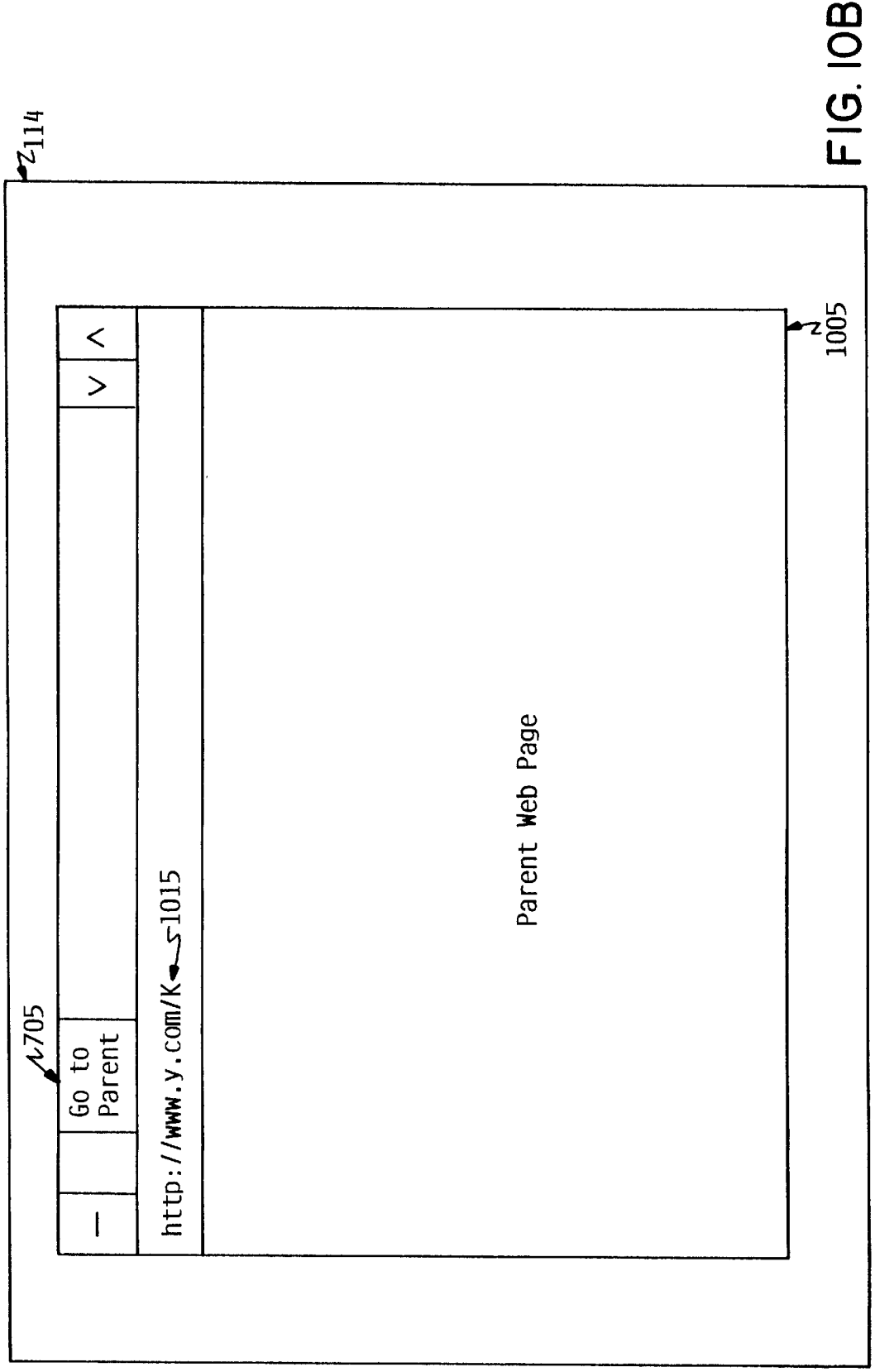

FIGS. 10a and 10b show example screen-contents displayed by browser 399 on display screen 114 before and after, respectively, the user pressed go-to-parent button 705. Referring to FIG. 1a, window 1005 is displayed on display screen 114. Displayed within window 1005 are go-to-parent button 705 and URL 1007, which has example, fictitious contents "http://www.y.com/k/l". Browser 399 has retrieved the web page associated with URL 1007 and displayed its contents within window 1005. In this example, the contents of the web page are "Original Web Page". Referring to FIG. 10b, in response to the user pressing go-to-parent button 705, browser 399 has removed the narrow-most element ("L") from URL 1007 to yield parent-URL 1015, which has example, fictitious contents "http://www.y.com/k". Browser 399 then retrieved the web page associated with URL 1015 and displayed it in window 1005. In this example, the contents of the web page pointed to by URL 1015 are "Parent Web Page".

Figure 11A:
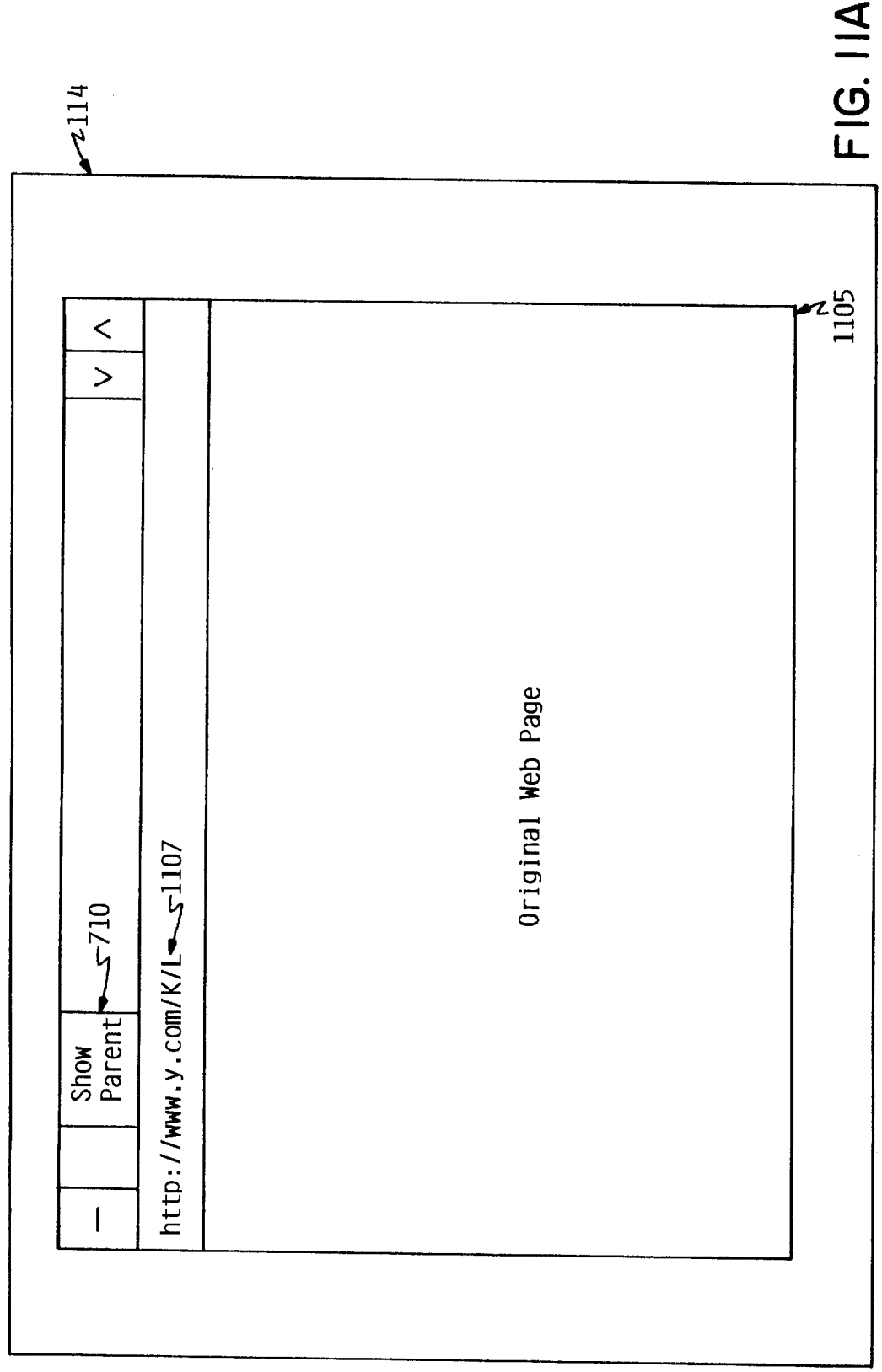
Figure 11B:
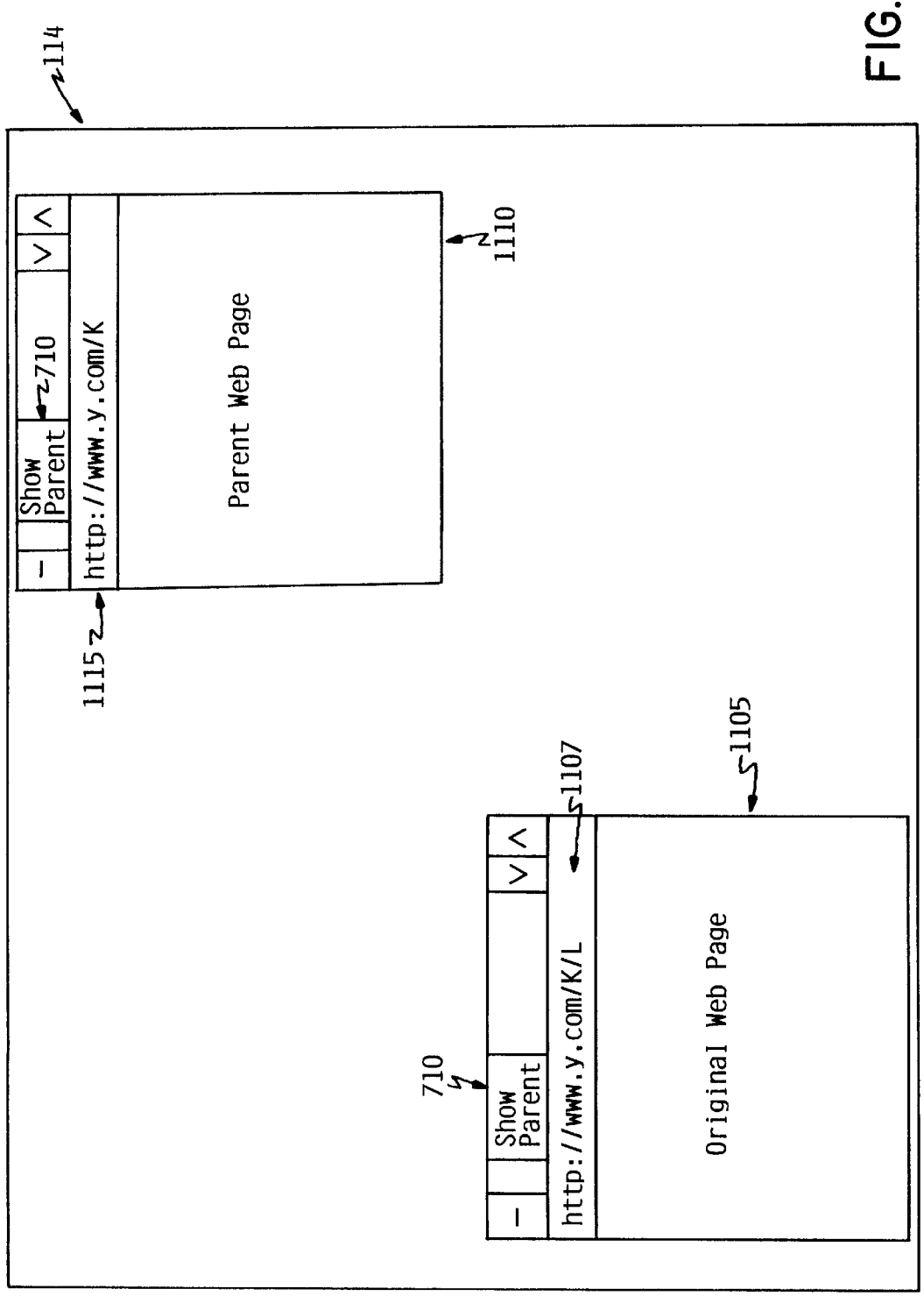

FIGS. 11a and 11b show example screen-contents displayed by browser 399 on display screen 114 before and after, respectively, the user pressed show-parent button 710. Referring to FIG. 11a, window 1105 is displayed on display screen 114. Displayed within window 1105 are show-parent button 710 and URL 1107, which has example, fictitious contents "http://www.y.com/k/l". Browser 399 has retrieved the web page associated with URL 1107 and displayed its contents within window 1105. In this example, the contents of the web page are "Original Web Page". Referring to FIG. 11b, in response to the user pressing show-parent button 710, browser 399 has removed the narrow-most element ("L") from URL 1107 to yield parent-URL 1115, which has example, fictitious contents "http://www.y.com/k". Browser 399 then retrieved the web page associated with URL 1115 and displayed it in window 1110. In this example, the contents of the web page pointed to by URL 1115 are "Parent Web Page". Window 1105 remains on display 114.

Figure 12A:
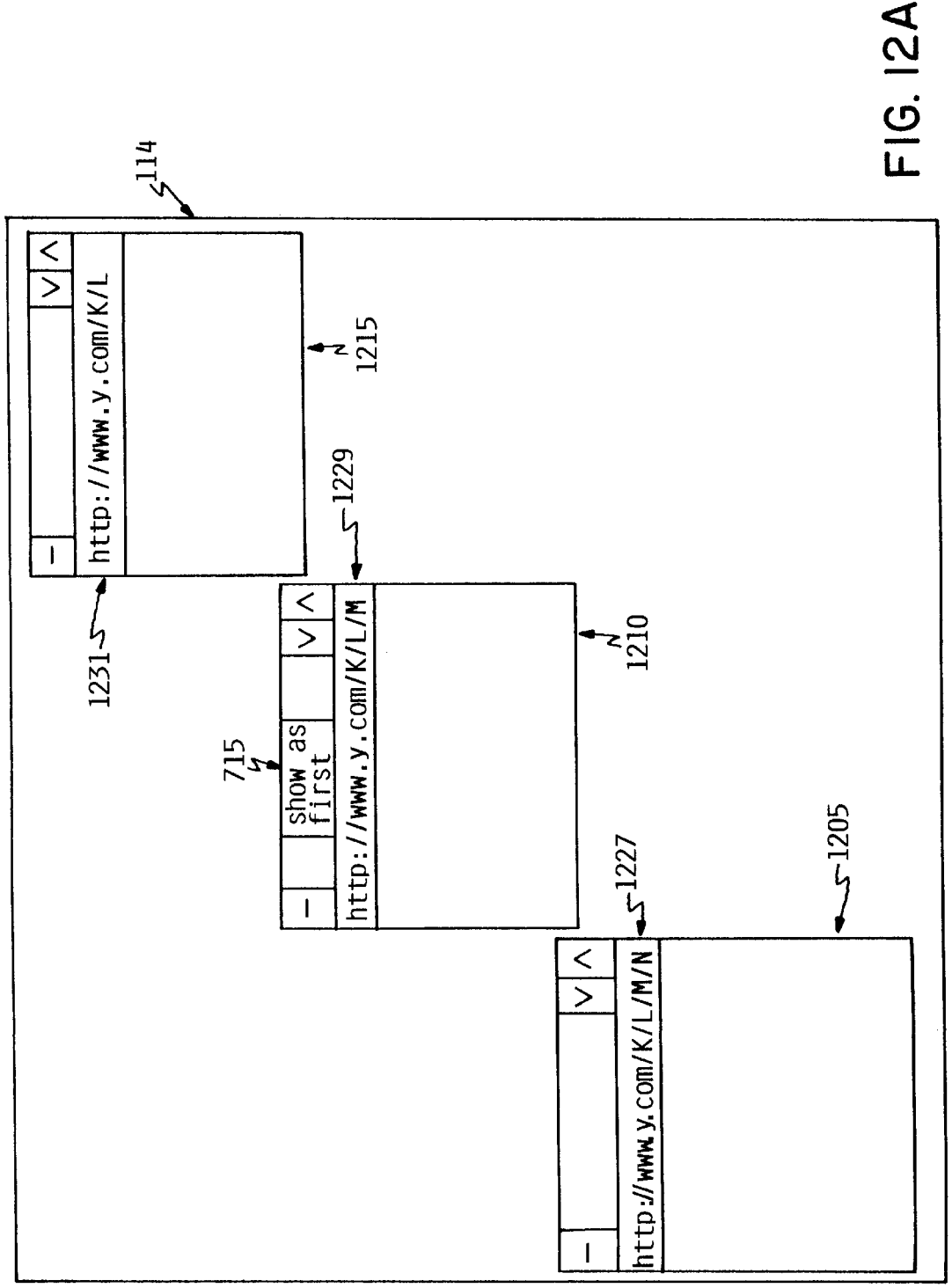
Figure 12B:
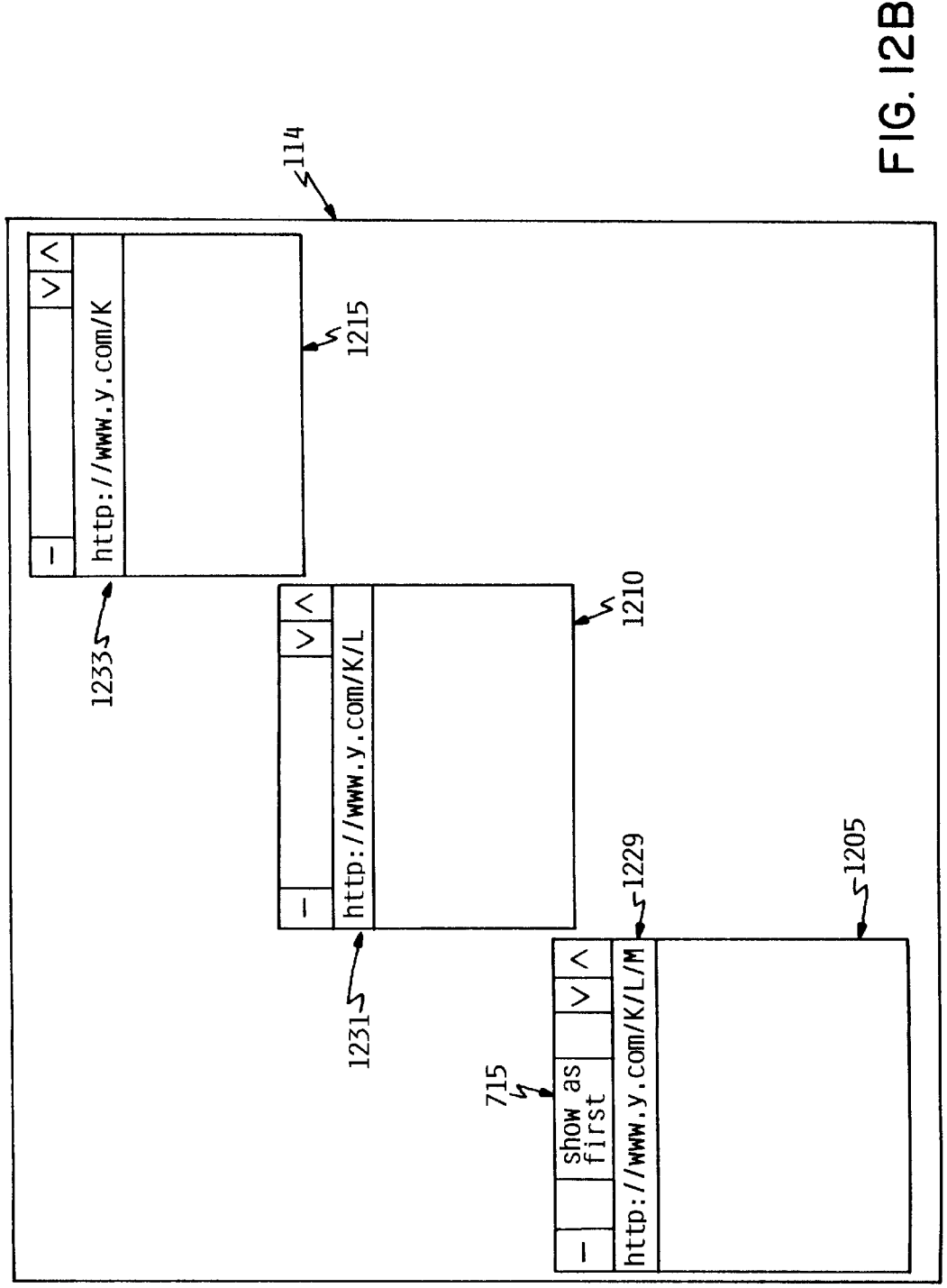

FIGS. 12a and 12b show example screen-contents displayed by browser 399 on display screen 114 before and after, respectively, the user pressed show-as-first button 715. Referring to FIG. 12a, windows 1205, 1210, and 1215 are displayed on display screen 114. Displayed within window 1205 is URL 1227, which has example, fictitious contents "http://www.y.com/k/l/m/n". Browser 399 has retrieved the web page associated with URL 1227 and displayed its contents (not shown) within window 1205. Displayed within window 1210 are show-as-first button 715 and URL 1229, which has example, fictitious contents "http://www.y.com/k/l/m". Browser 399 has retrieved the web page associated with URL 1229 and displayed its contents (not shown) within window 1210. Displayed within window 1215 is URL 1231, which has example, fictitious contents "http://www.y.com/k/l". Browser 399 has retrieved the web page associated with URL 1231 and displayed its contents (not shown) within window 1215. Window 1210 is the parent of window 1205, and window 1215 is the parent of window 1210. Likewise, window 1210 is the child of window 1215, and window 1205 is the child of window 1210. URL 1229 is the parent of URL 1227 and URL 1231 is the parent of URL 1229. Likewise, URL 1227 is the child of URL 1229, which is the child of URL 1231.

Referring to FIG. 12*b*, in response to the user pressing show-as-first button 715, browser 399 has moved the web page associated with URL 1229 to the first window in the hierarchical chain, which is window 1205. Likewise, the web page associated with URL 1231 is now displayed in window 1210. Browser 399 also found the parent web-page of URL 1231 and displayed it in window 1215 with URL 1233, which has the example, fictitious contents "http://www.y.com/k". Since browser 399 has displayed URL 1229 and its associated web page in the first window in the hierarchial chain, URL 1227, which was present in FIG. 12*a*, is absent in FIG. 12*b*. Browser 399 found the parent of window 1231 by removing the narrow-most element from URL 1231 ("L") to yield URL 1233.

Figures 2, 13B:
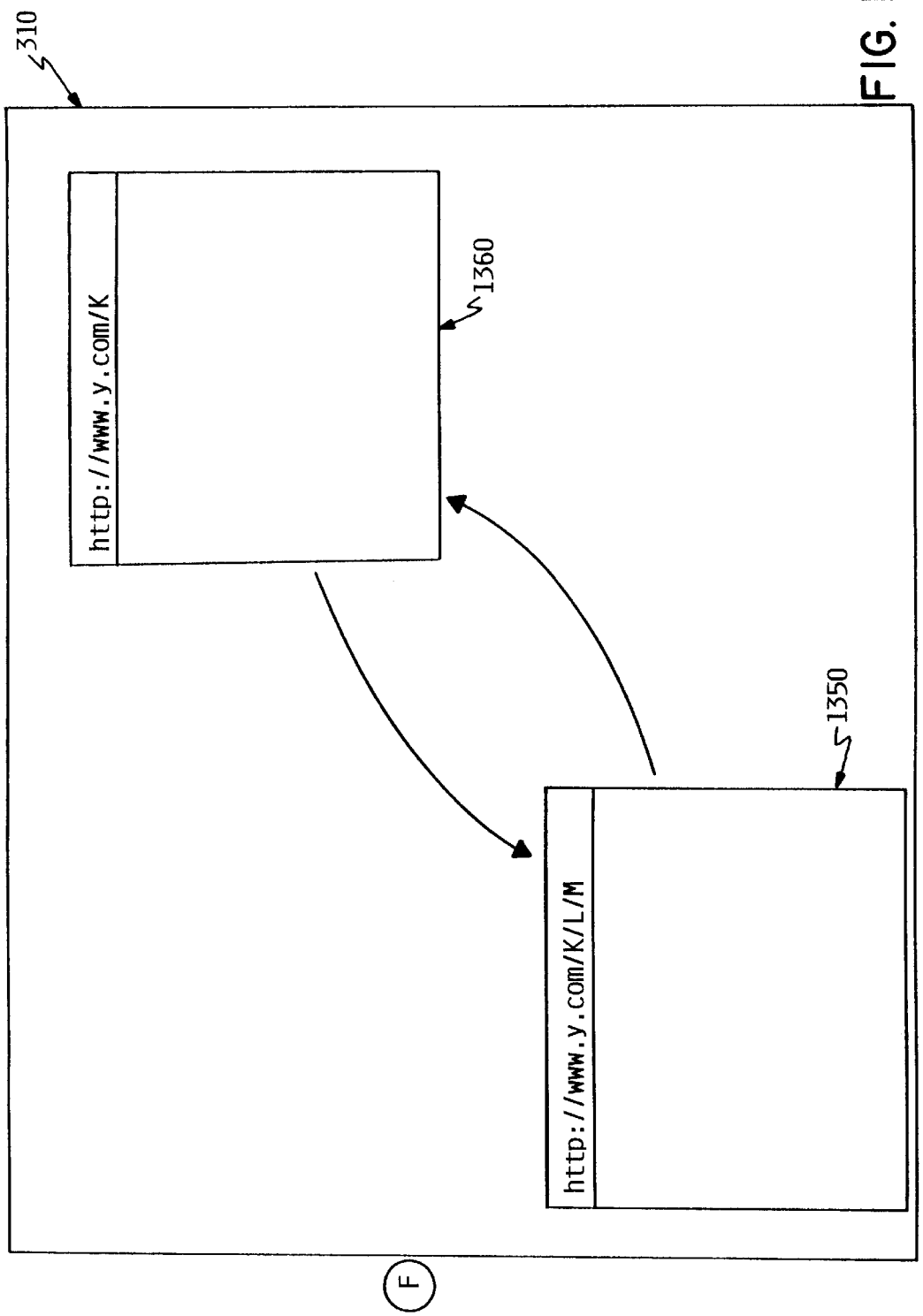

FIGS. 13*a* and 13*b* show example screen-contents displayed by browser 399 on display screen 114 and associated, example contents of window list 310 before and after, respectively, the user pressed delete-window button 720. Referring to FIG. 13*a*, windows 1305, 1310, and 1315 are displayed on display screen 114. Displayed within window 1305 is URL 1327, which has example, fictitious contents "http://www.y.com/k/l/m". Displayed within window 1310 is URL 1329, which has example, fictitious contents "http://www.y.com/k/l" and delete-window button 720. Displayed within window 1315 is URL 1331, which has example, fictitious contents "http://www.y.com/k". Window list 310 contains example contents associated with the example screen-contents displayed on display screen 114. Window list 310 contains window-list elements 1350, 1355, and 1360. Window-list element 1350 corresponds to window 1305, window-list element 1355 corresponds to window 1310, and window-list element 1360 corresponds to window 1315. Window list 310 contains forward and backward pointers 1370, 1372, 1374, and 1376 that connect the window-list elements in a hierarchical list. Window-list element 1355 is the parent of window-list element 1350, and window-list element 1360 is the parent of the window-list element 1355. Similarly, window-list element 1350 is the child of window-list element 1355, and window-list element 1355 is the child of window-list clement 1360. URL 1327 is the child of URL 1329, which is the child of URL 1331. Likewise, URL 1331 is the parent of URL 1329, which is the parent URL 1327.

Referring to FIG. 13*b*, in response to the user pressing delete-window button 720, browser 399 has deleted window 1310 from display screen 114. Windows 1305 and 1315 remain on display screen 114. Browser 399 also deleted window-list element 1355 from window list 310, so that only window-list elements 1350 and 1360 remain.

Figures 1, 14A:
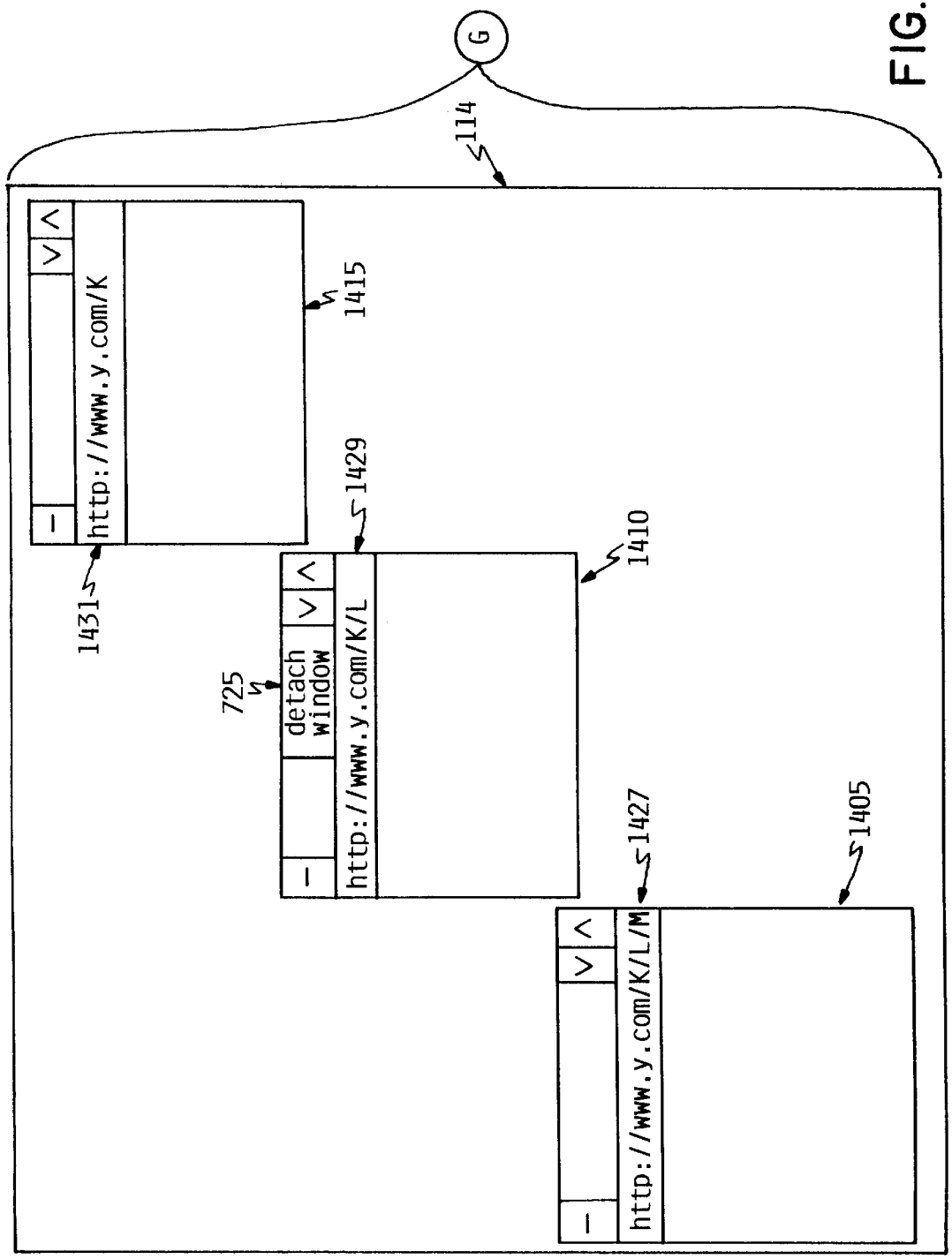
Figures 2, 14A:
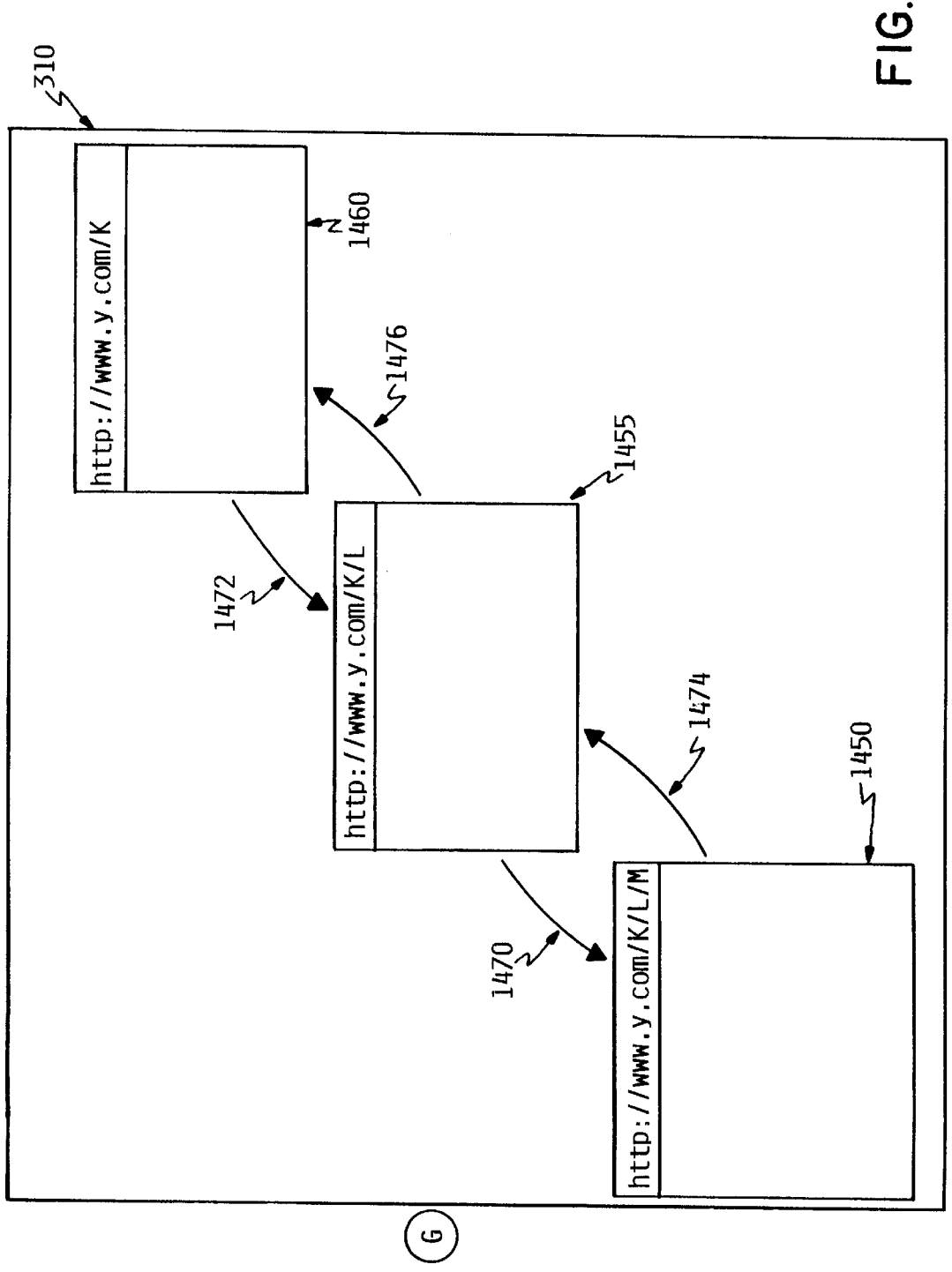
Figures 1, 14B:
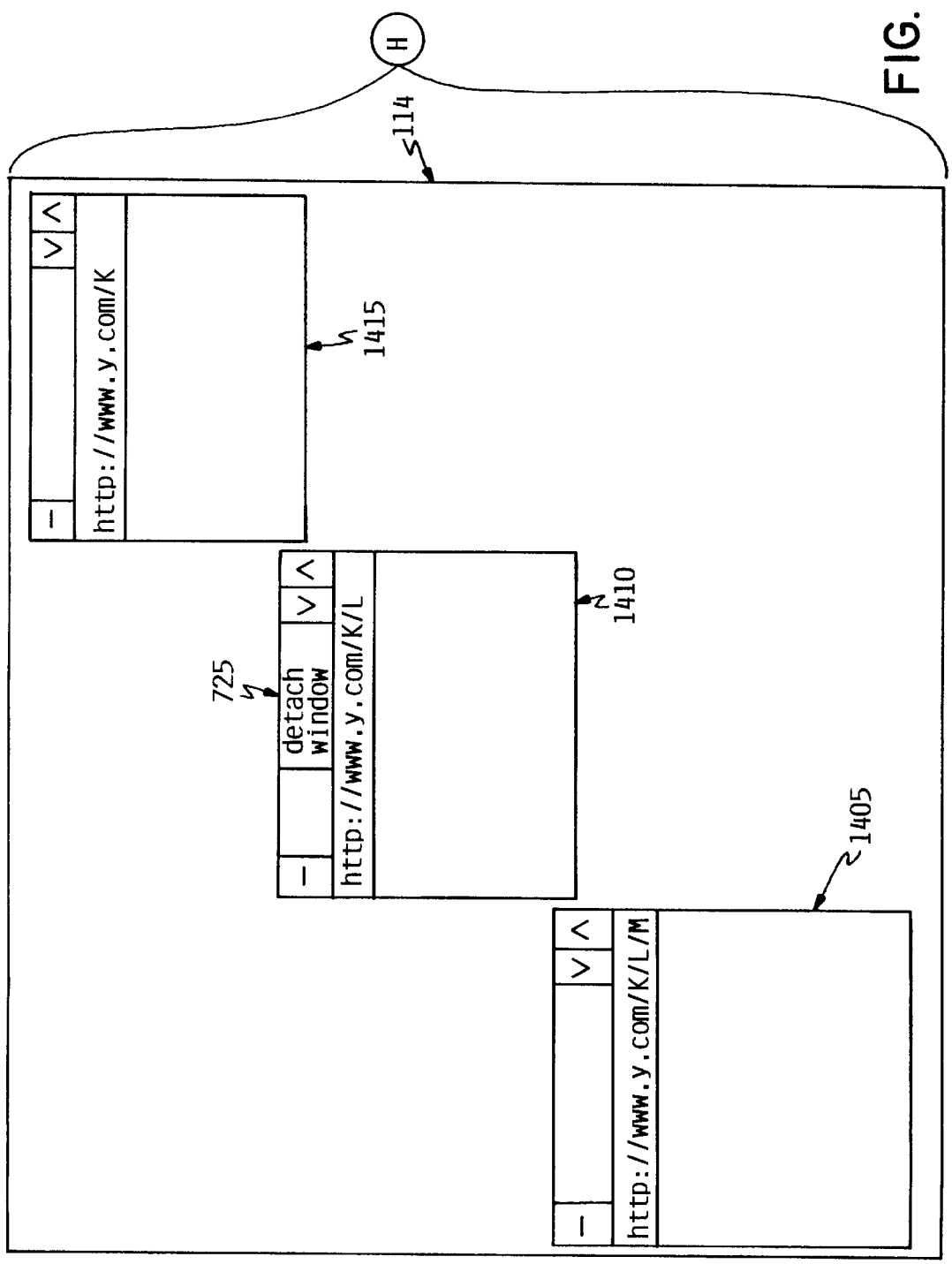
Figures 2, 14B:
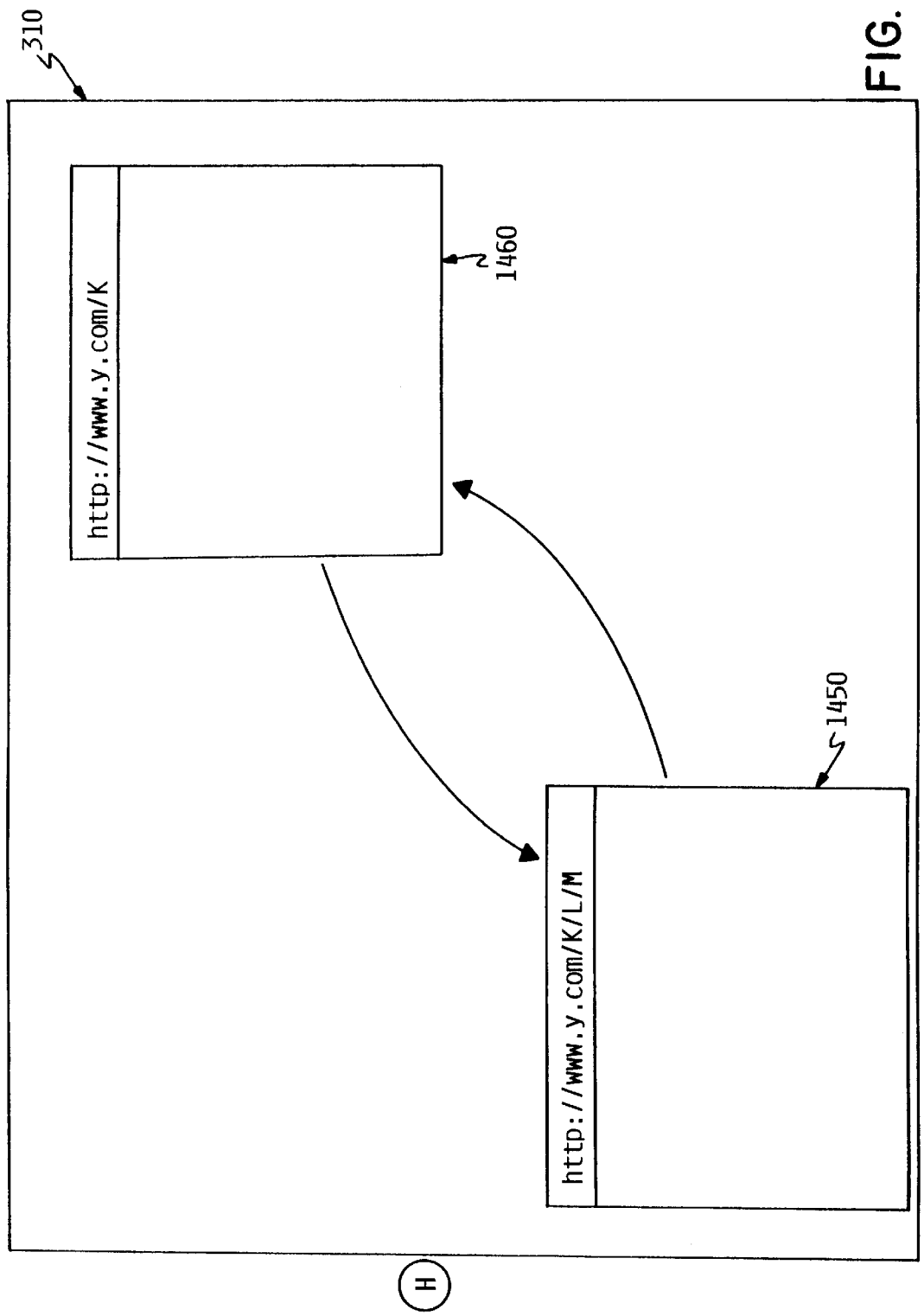

FIGS. 14*a* and 14*b* show example screen-contents displayed by browser 399 on display screen 114 and associated example window-list 310 contents before and after, respectively, the user pressing detach-window button 725. Referring to FIG. 14*a*, windows 1405, 1410, and 1415 are displayed on display screen 114. Displayed within window 1405 is URL 1427, which has the example, fictitious contents "http://www.y.com/k/l/m". Displayed within window 1410 is URL 1429 which has the example, fictitious contents "http://www.y.com/k/l". Also displayed within window 1410 is detach-window button 725. Displayed within window 1431 is URL 1431 having the example, fictitious contents "http://www.y.com/k". URL 1427 is the child of URL 1429, which is the child of URL 1431. Likewise, URL 1431 is the parent of URL 1429, which is the parent of URL 1427. Window list 310 contains example contents associated with the example screen-contents displayed on display screen 114. Window list 310 contains window-list elements 1450, 1455, and 1460. Window-list element 1450 corresponds to window 1405, window-list element 1455 corresponds to window 1410, and window-list 1460 corresponds to window 1415. Window list 310 contains forward and backward pointers 1470, 1472, 1474, and 1476 that connect the window-list elements in a hierarchical list. Window-list element 1455 is the parent of window-list element 1450, and window-list element 1460 is the parent of window-list element 1455. Similarly, window-list element 1450 is the child of window-list element 1455, which is the child of window-list element 1460.

Referring to FIG. 14*b*, browser 399 has removed window-list element 1455 from window list 310, but window-list elements 1450 and 1460 remain. The windows displayed on display screen 114 are unchanged from FIG. 14*a*. The user might wish to use detach-window button 725 to achieve this result when the user has a particular page of interest that the user wishes to retain for future reference, such as a table of contents. This points out that window list 310 is a list of related, linked windows, and after detaching, browser 399 still has knowledge of an additional window that is not in window list 310.

Figures 1, 15A:
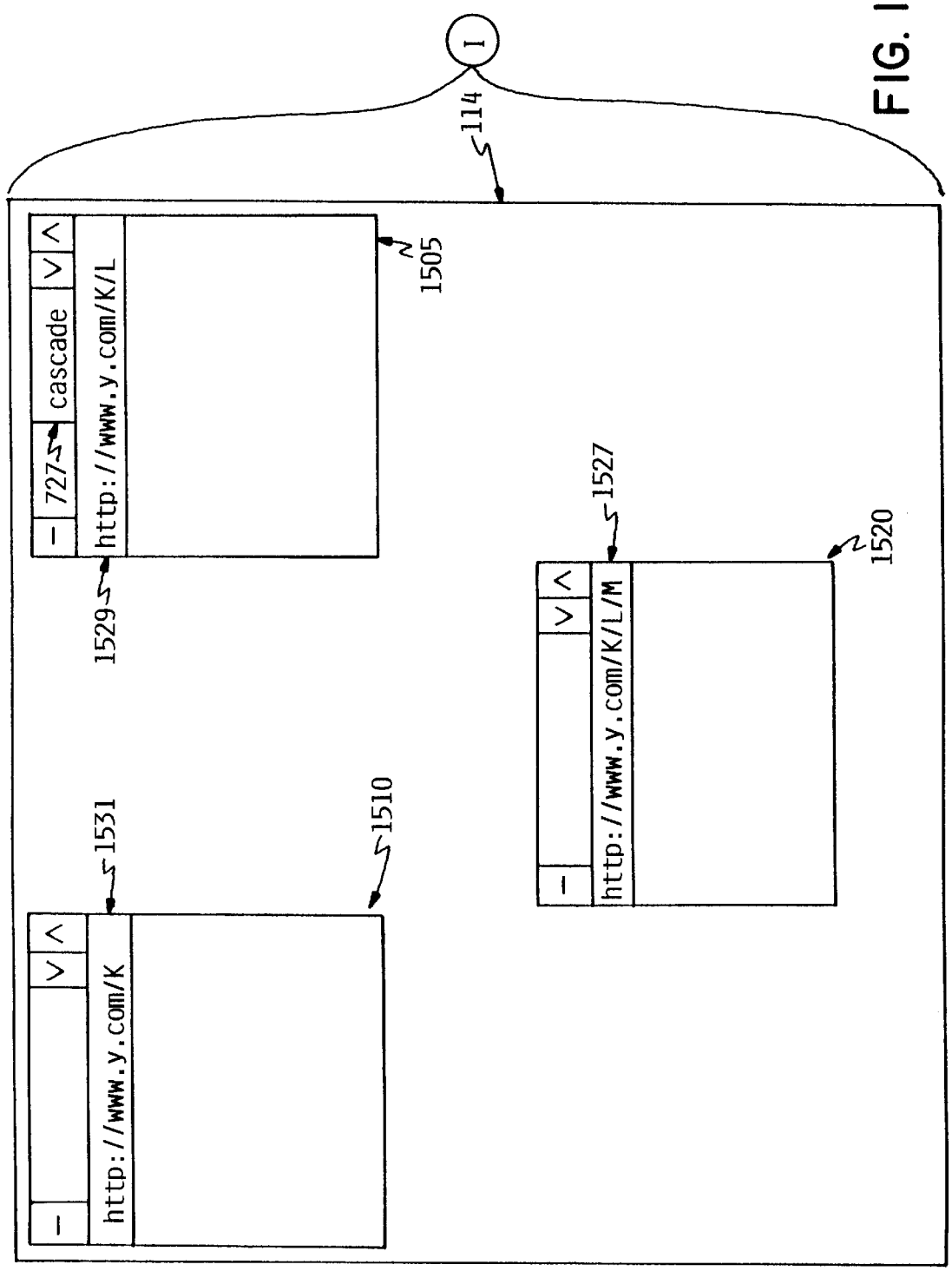
Figures 2, 15A:
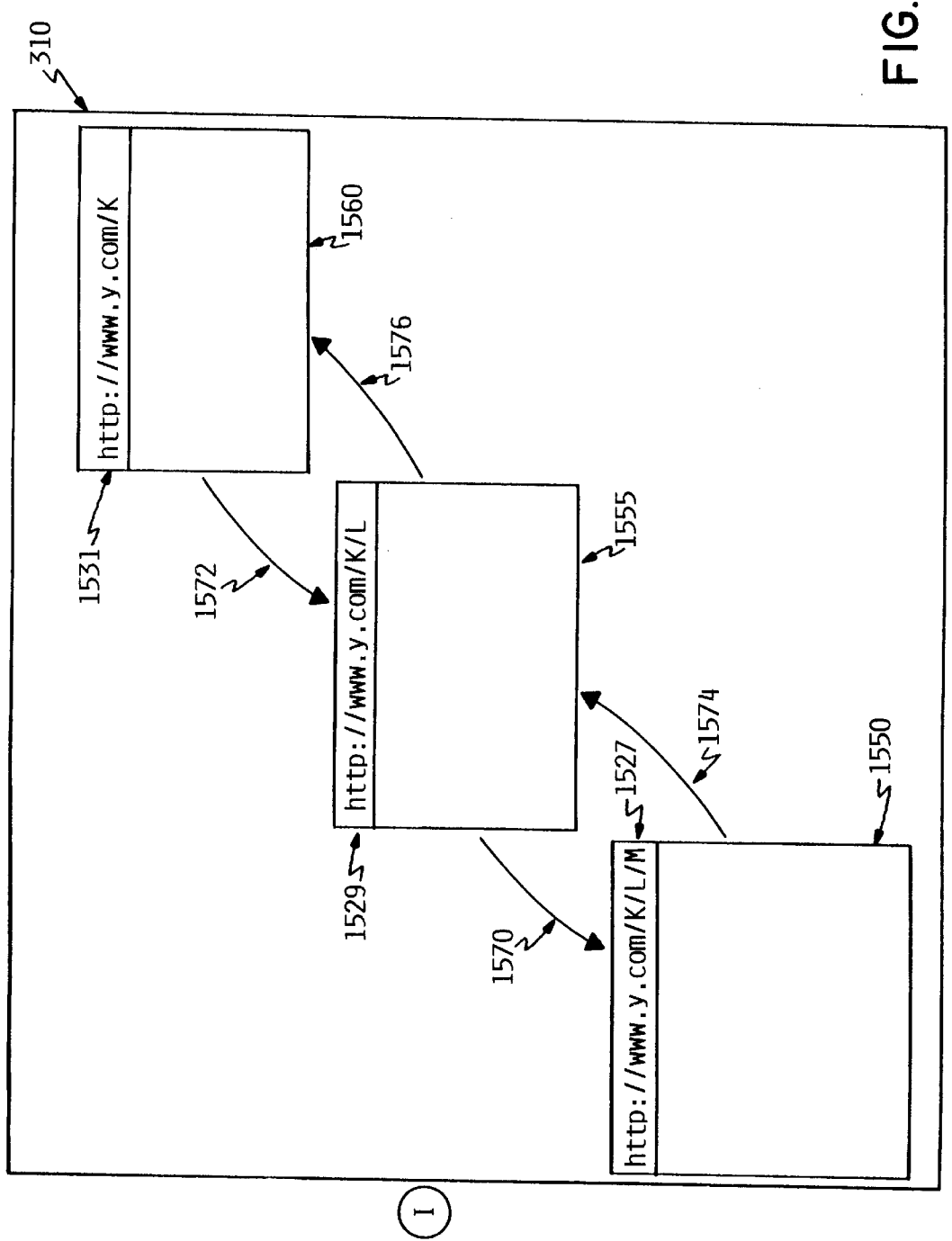
Figure 15B:
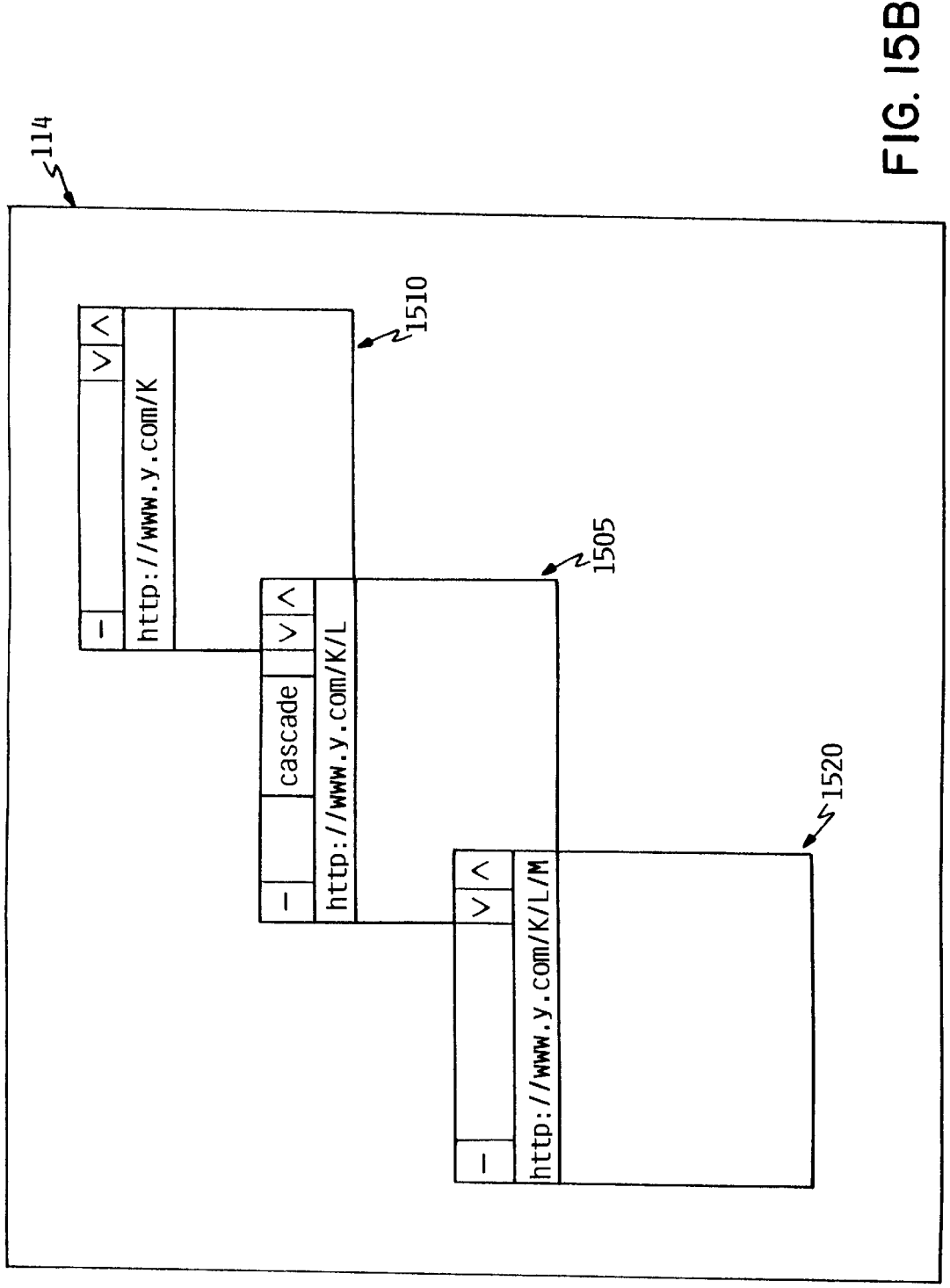

FIGS. 15*a* and 15*b* show example screen-contents displayed by browser 399 on display screen 114 and associated, example window-list 310 contents before and after, respectively, the user pressing cascade button 727. Referring to FIG. 15*a*, window s 1505, 1510, and 1520 are displayed on display screen 114. Displayed within window 1505 is URL 1529, which contents example, fictitious contents "http://www.y.com/k/l". Displayed within window 1510 is URL 1531, which has example, fictitious contents "http://www.y.com/k". Displayed within window 1520 is URL 1527, which ha s example, fictitious contents "http://www.y.com/k/l/m". Window list 310 contains example contents associated with the example screen-contents displayed on display screen 114. Window list 310 contains window-list elements 1550, 1555, and 1560. Window-list element 1550 corresponds to window 1520, window-list element 1555 corresponds to window 1505, and window-list element 1560 corresponds to window 1510. Window list 310 contains forward and backward pointers 1570, 1572, 1574, and 1576 that connect the window-list elements in a hierarchical list. Window-list element 1560 is the parent of window-list element 1555, which is the parent of window-list element 1550. Likewise, window-list element 1550 is the child of window-list element 1555, which is the child of window-list element of window 1560. URL 1527 is the child of URL 1529, which is the child of URL 1531. Likewise, URL 1531 is the parent of URL 1529, which is the parent of URL 1527. Referring to FIG. 15*b*, in response to the user pressing cascade button 727, browser 399 has displayed windows 1520, 1505, and 1510 on display screen 114 in a cascading format with the windows partially overlapping in the hierarchical order that their corresponding window-list elements exist in window list 310, as shown in FIG. 15*a*.

Figure 16B:
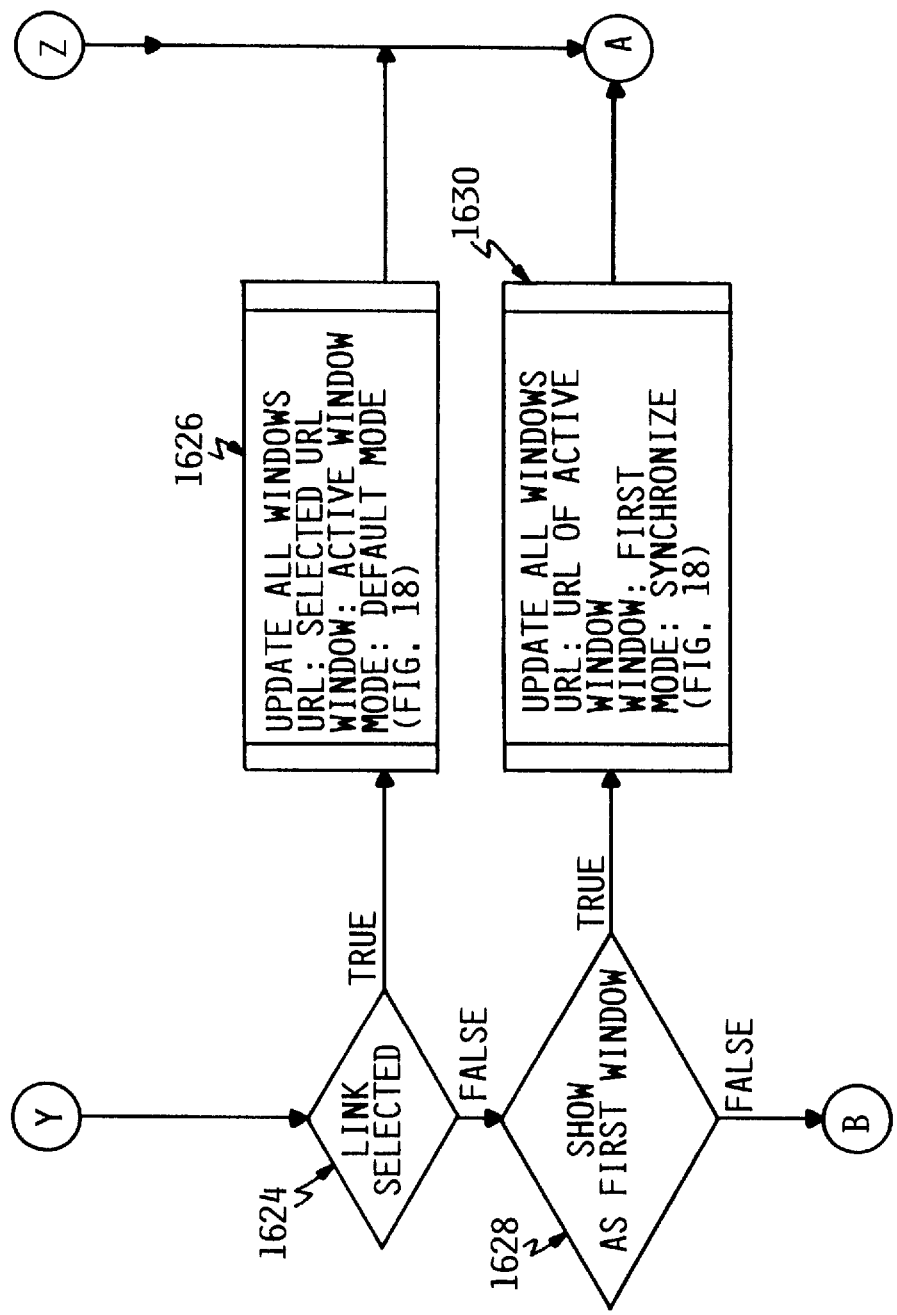
FIGS. 16, 17, 18, 19, and 20 are flowcharts that describe the operation of the preferred embodiment.
Figure 17:
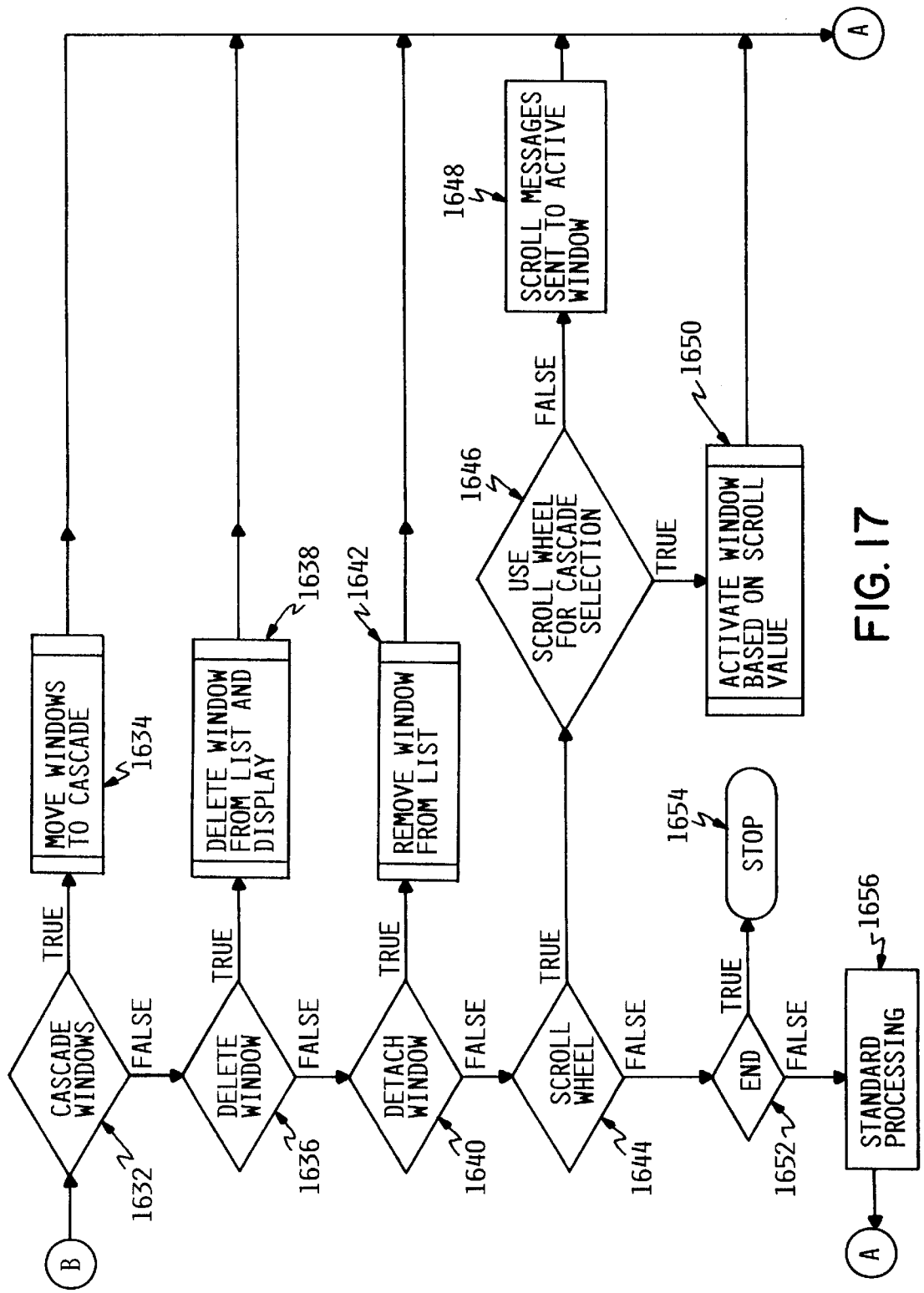

FIGS. 16–20 illustrate flowcharts that describe the operation of the preferred embodiment. Referring to FIG. 16, illustrated is the main logic of browser 399 that responds to requests from the user. At block 1600, browser 399 starts. Control then continues to block 1602 where browser 399 retrieves user preferences 309. Control then continues to block 1604 where browser 399 determines whether the user has selected modify user-settings 730, as previously illustrated in FIG. 7. Referring again to FIG. 16, control then continues to block 1606 where browser 399 displays user-preferences dialog 800, as illustrated in FIG. 8, and saves the user selections in user preferences 309. Referring again to FIG. 16, if the determination at block 1604 is true, browser 399 then returns to block 1604 as previously described above.

If the determination at block 1604 is false, then control continues to block 1608 where browser 399 determines whether the user has selected go-to-parent button 705, as illustrated in FIG. 7. Referring again to FIG. 16, if the determination at block 1608 is true, control then continues to block 1610 where browser 399 clips the URL of the page displayed in the current window, as further described below under the description for FIG. 20. Referring again to FIG. 16, control then continues to block 1612 where browser 399 invokes the update all windows function, as further described below under the description for FIG. 18. Browser 399 passes to the update-all-windows function the URL that was clipped in block 1610, the window that was active when the user selected go-to-parent button 705, and the default mode, which is the mode that the user selected in user preferences 800. Referring again to FIG. 16, control then returns to block 1604, as previously described above.

If the determination at block 1608 is false, then control continues to block 1614 where browser 399 determines whether the user selected show-parent-window button 710, as illustrated in FIG. 7. Referring again to FIG. 16, if the determination at block 1614 is true, then browser 399 continues to block 1616 where browser 399 determines whether the active window (the window active when the user selected show-parent-window button 710) is the last window in window-chain list 1002. If the determination at block 1616 is true, then control continues to block 1618 where browser 399 creates a new window and adds it to the end of window-chain list 1002. Control then continues to block 1620 as described below.

If the determination at block 1616 is false, then control continues directly to block 1620 where browser 399 clips the URL that is associated with the page displayed in the active window, as further described below under the description for FIG. 20. Referring again to FIG. 16, control then continues to block 1622 where browser 399 updates all windows in window-chain list 1002, as further described below under the description for FIG. 18. Browser 399 passes to the function of FIG. 18 the URL previously clipped at 1620, the next window in window list 1602 (which would be the parent of the active window), and an indication of chain mode. Control then returns to block 1604, as previously described above.

If the determination at block 1614 is false, then control continues to block 1624 where browser 399 determines whether the user has selected a hyperlink in the active window. If the determination at block 1624 is true, then control continues to block 1626 where browser 399 invokes the update-all-windows function, as further described below under the description for FIG. 18. Browser 399 passes to the update-all-windows function the URL selected by the user, the active window, and an indication of default mode, which is the mode selected by the user in dialog 800. Control then returns to block 1604, as previously described above.

If the determination at block 1624 is false, then control continues to block 1628 where browser 399 determines whether the user has selected show-as-first window 715. If the determination at block 1628 is true, then control continues to block 1630 where browser 399 invokes the update-all-windows function, as further described below, under the description for FIG. 18. Browser 399 passes to the update-all-windows function the URL of the active window, the first window, and an indication of synchronized mode. Control then returns to block 1604 as previously described above.

If the determination at block 1628 is false, then control continues to block 1632 where browser 399 determines whether the user has selected cascade-windows button 727. If the determination at block 1632 is true, then control continues to block 1634 where browser 399 moves the windows on display 1614 to be in a cascading orientation in the hierarchical order indicated by window list 310. An example of this cascading orientation is shown in FIG. 15b. Referring again to FIG. 16, control then returns to block 1604, as previously described above.

If the determination at block 1632 is false, then control continues to block 1636 where browser 399 determines whether the user has selected delete-window button 720. If the determination at block 1636 is true, then control continues to block 1638 where browser 399 deletes the active window from window list 1002 and deletes the active window from display screen 114. An example of the delete-window processing is shown in FIGS. 13a and 13b. Referring again to FIG. 16, control then returns to block 1604, as previously described above.

If the determination at block 1636 is false, then control continues to block 1640 where browser 399 determines whether the user selected detach window-button 725. If the determination at block 1640 is true, then control continues to block 1642 where browser 399 removes the active window from window list 1002, but the active window remains displayed on display screen 114. An example of the detach-window processing is shown in FIGS. 14a and 14b. Referring again to FIG. 16, control then returns to block 1604, as previously described above.

If the determination at block 1640 is false, then control continues to block 1644 where browser 399 determines whether the user moved scroll wheel 119 on pointing device 118. If the determination at block 1644 is true, then control continues to block 1646 where browser 399 determines whether movement of the scroll wheel indicates that the user desires cascade selection. The user could indicate this desire by pressing some key on the keyboard in combination with using the scroll wheel, such as the shift or control key. If the determination at block 1646 is false, then the user desires the scroll wheel to be used in the standard way by the window, so control continues to block 1648 where browser 399 sends the scroll messages to the active window which processes them as it normally does, which typically means scrolling the window contents up and down. Control then returns to block 1604, as previously described above.

If the determination at block 1646 is true, then control continues to block 1650 where browser 399 activates the appropriate window in window list 1002 depending on the scroll value that the user selected using scroll wheel 119. For example, if the user moved the scroll value by a small amount, then browser 399 activates the parent of the current window, but if the user moves scroll wheel 119 by a large amount, then browser 399 activates a further ancestor of the current window. Control then returns to block 1604 as previously described above.

If the determination at block 1644 is false, then control continues to block 1652 where browser 399 determines whether the user has requested that browser 399 be exited. If the determination at block 1652 is true, then control continues to block 1654 where processing stops. If the determination at block 1652 is false, then control continues to block 1656 where other user operations are processed. Control then returns to block 1604, as previously described above.

Figure 18A:
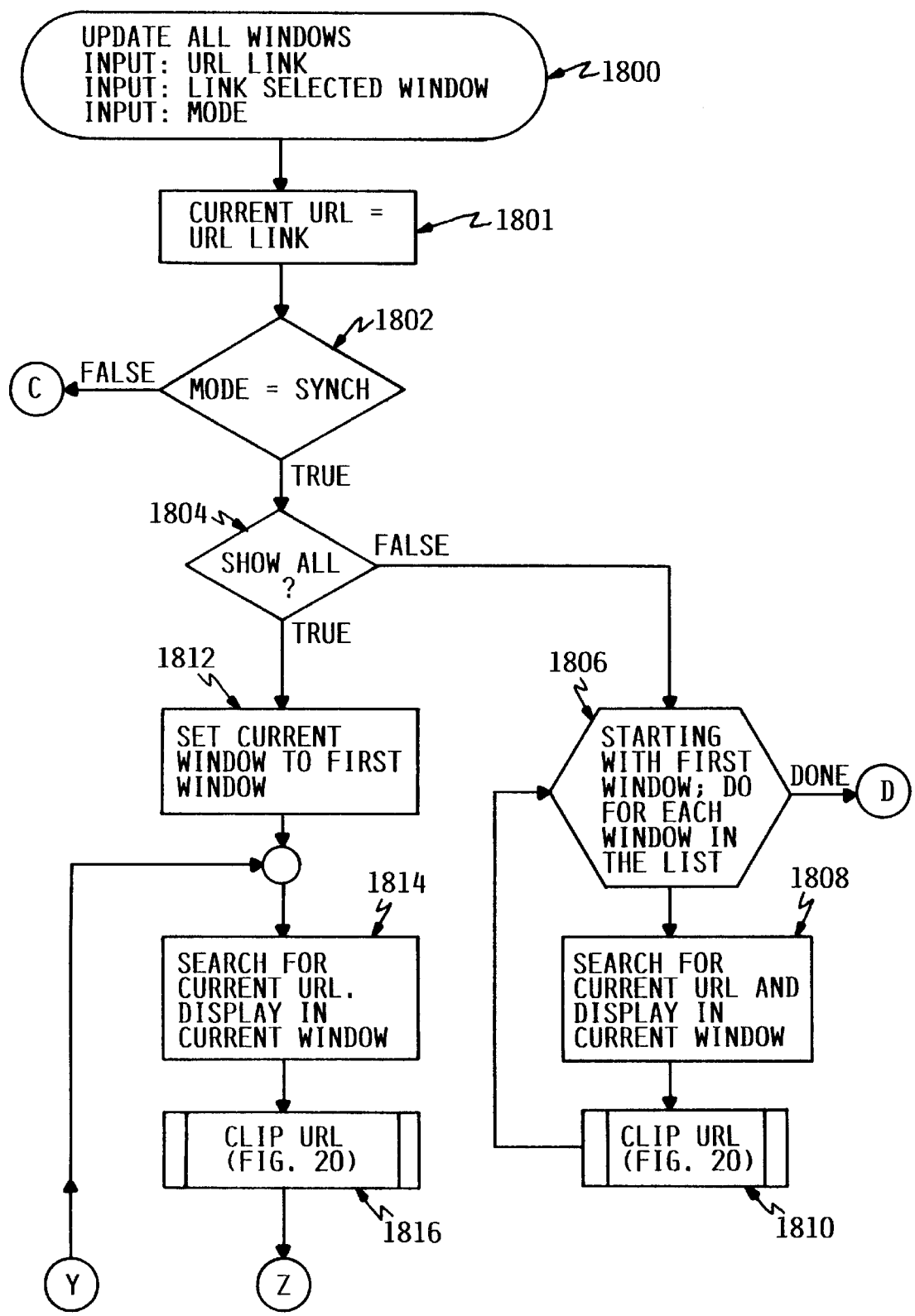
Figure 18B:
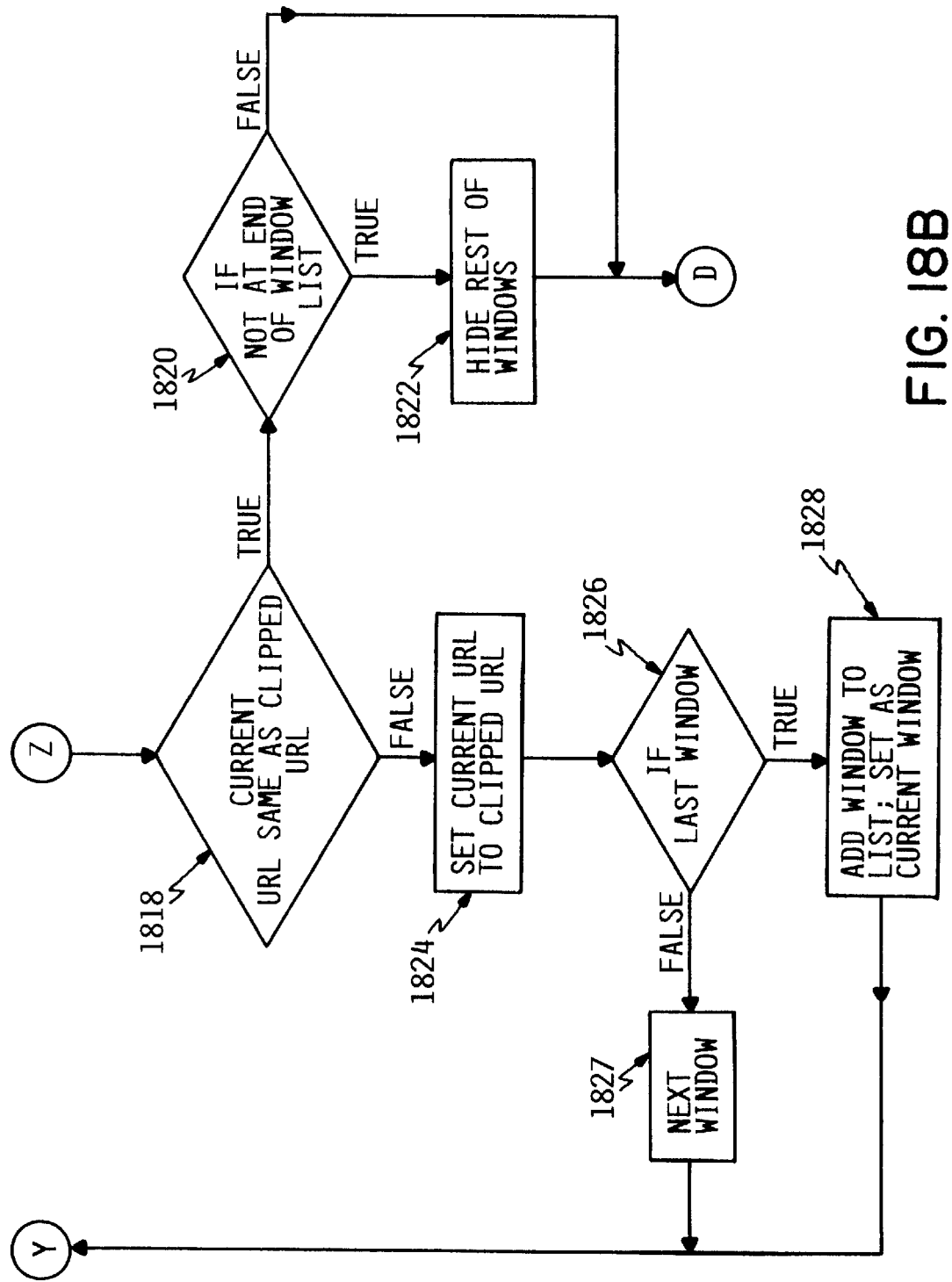
Figure 19:
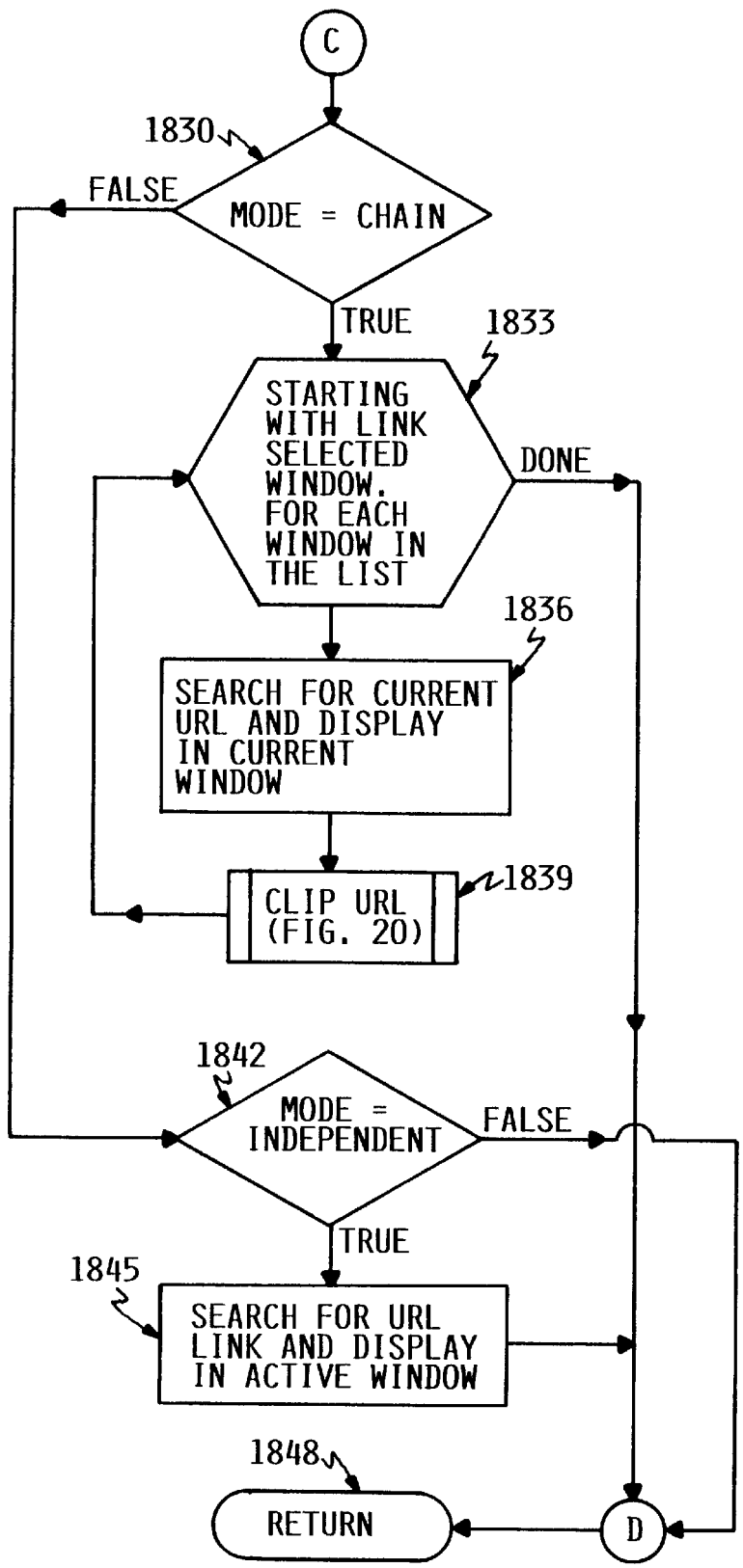

Referring to FIG. 18, there is illustrated sample logic that processes the update-all-windows function. This function accepts as input a URL link, a link-selected window, and a mode. At block 1800, control starts. Control then continues to block 1801 where browser 399 sets the current URL to be the input URL link. Control then continues to block 1802 where browser 399 determines whether the input mode is "synchronize". If the determination at block 1802 is true, then control continues to block 1804 where browser 399 determines whether the user selected show all 807, as previously described under the description for FIG. 8. Referring again to FIG. 18, if the determination at block 1804 is false, control then continues to a loop represented in blocks 1806, 1808, and 1810. This loop is executed once for every window in window list 1002 starting with the first window in the list. Blocks 1808 and 1810 are executed for each window in window list 1002, and block 1806 checks the boundary conditions of the loop. At block 1808, browser 399 searches for the current URL associated with the current window in window list 1002 and displays the page associated with the current URL in the current window. Control then continues to block 1810 where browser 399 clips the current URL, as further described below under the description for FIG. 20. Control then returns to block 1806, where browser 399 increments to the next window in window list 1002. When all windows have been processed, control exits to block 1848, as described below.

If the determination at block 1804 is true, then control continues to block 1812 where browser 399 sets the current window to be the first window in window list 1002. Control then continues to block 1814 where browser 399 searches for the current URL in the current window and displays the retrieved page associated with the current URL in the current window. Control then continues to block 1816 where browser 399 clips the current URL, as further described below under the description for FIG. 20. Control then continues to block 1818 where browser 399 determines whether the current URL is the same as the clipped URL. If the determination at block 1818 is true, then control continues to block 1820 where browser 399 determines whether the current window is the last window in window list 1002. If the current window is not the last window in window list 1002, then control continues to block 1822 where browser 399 hides from display the ancestor windows of the current window in window list 1002. Control then continues to block 1848, as further described below. If the current window is the last window in window list 1002, then control continues directly from block 1820 to block 1848.

If the determination at block 1818 is false, then control continues to block 1824 where browser 399 sets the current URL to be the clipped URL. Control then continues to block 1826 where browser 399 determines whether the current window is the last window in window list 1002. If the determination at block 1826 is false, then control continues to block 1827 where browser 399 sets the current window to be the next window. Control returns to block 1814, as previously described above.

If the determination at block 1826 is true, then control continues to block 1828 where browser 399 creates a new window and adds the newly created window to window list 1002 and sets the added, newly created window to be the current window. Control then returns to block 1814, as previously described above.

If the determination at block 1802 is false, then control continues to block 1830 where browser 399 determines whether the input mode is chain mode. If the determination at block 1830 is true, then control continues to block 1833 where a loop represented by blocks 1836 and 1839 is executed once for every window in window list 1002 starting with the linkselected window, which was passed as input to the function of FIG. 18. At block 1836, browser 399 searches for the current URL and displays it is the current window. Control then continues to block 1839 where browser 399 clips the current URL and saves the result in the current URL. Thus, block 1839 initially clips the URL link, which was passed as input to the function of FIG. 18, and in the loop thereafter block 1839 is repeatedly clipping the result. When the loop completes, control continues to block 1848 where the function returns.

When the determination at block 1830 is false, then control continues to block 1842 where browser 399 determines whether the input mode is independent. If the determination at block 1842, then control continues to block 1845 where browser 399 retrieves the page associated with the input URL link in the active window. Control then continues to block 1848 where the function returns.

If the determination at block 1842 is false, then control continues to block 1848 where the function returns.

Figure 20:
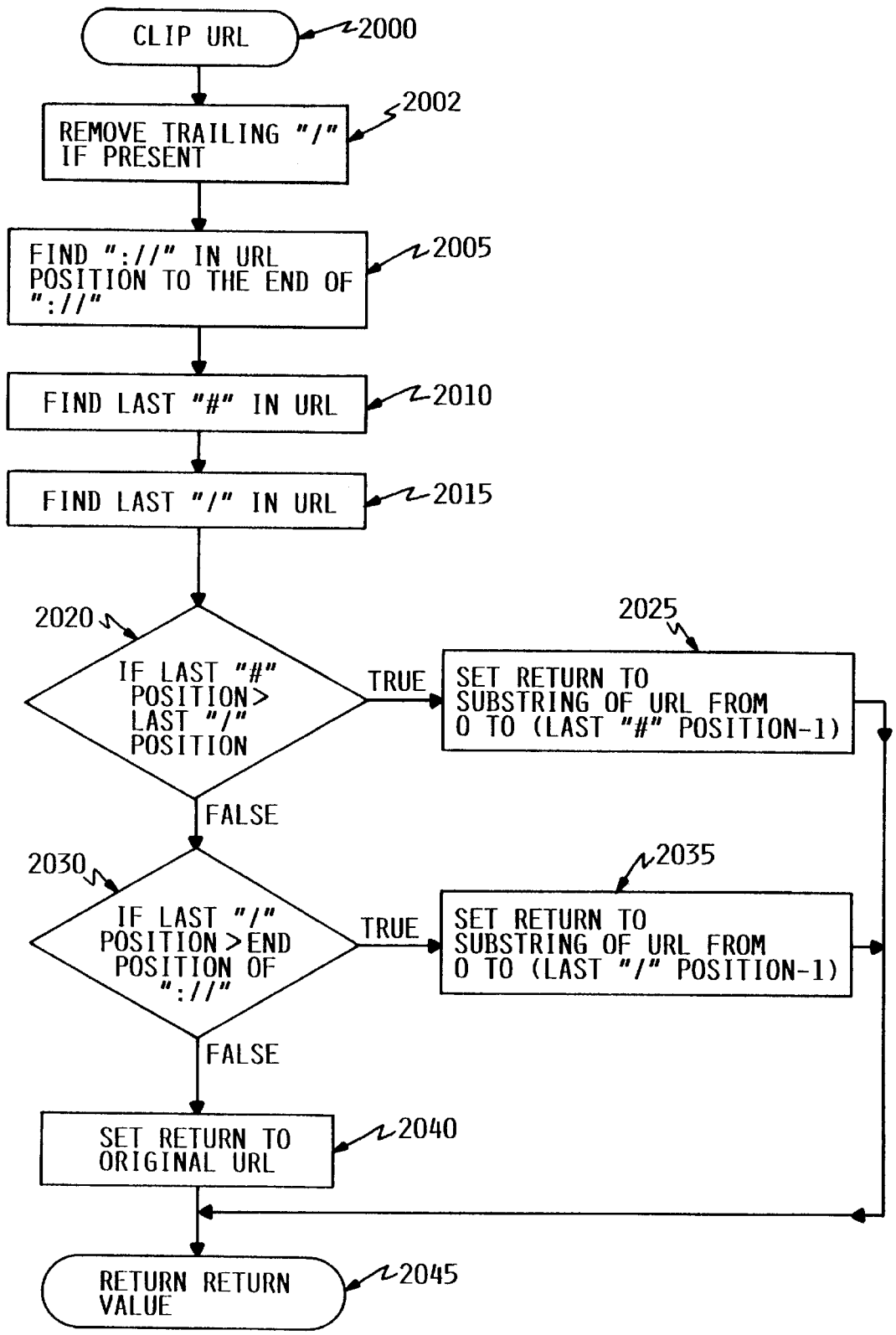

Referring to FIG. 20, there is illustrated example logic that clips the input URL. For example, the first time that the function of FIG. 20 is called, it will remove the file name from the input URL. The next time the function will remove the narrowest subdirectory, and so on until only the server name remains. At block 2000, control begins. Control then continues to block 2002 where browser 399 removes a trailing "/" from the URL, if it exists since some URLs contain a trailing "/" and some do not. Control then continues to block 2005 where browser 399 finds the string "://" in the input URL. Control then continues to block 2010 where browser 399 finds the position of the last "#" in the input URL. Control then continues to block 2015 where browser 399 finds the position of the last "/" in the input URL. Control then continues to block 2020 where browser 399 determines if the position of the last "#" in the input URL is greater than the position of the last "/" in the input URL. If the determination at block 2020 is true, then control continues to block 2025 where browser 399 sets the return value to be a substring of the input URL from zero to the position of the last "#" minus 1. Control then continues to block 2045 where browser 399 returns the return value. If the determination at block 2020 is false, then control continues to block 2030 where browser 399 determines if the position of the last "/" in the input URL is greater than the position of the end of the "://". If the determination at block 2030 is true, then control continues to block 2035 where browser 399 sets the return value to be the substring of the input URL from zero to the position of the last "/" minus one. By subtracting one from the last "/" position, browser 399 is not returning a trailing "/". In an alternative embodiment, the logic of block 2035 could be modified to return a trailing "/" by not subtracting one. Control then continues to block 2045 where the function returns the return value.

If the determination at block 2030 is false, then control continues to block 2040 where browser 399 sets the return value to be the original input URL. Control then continues to block 2045 where browser 399 returns the return value.

While this invention has been described with respect to the preferred and alternative embodiments, it will be understood by those skilled in the art that various changes in detail may be made therein without departing from the spirit, scope, and teaching of the invention. For example, browsers may become widely employed in consumer applications such as operator panels for consumer electronics, appliances, and automobiles. Accordingly, the herein disclosed invention is to be limited only as specified in the following claims.

What is claimed is:

1. A method that provides contextual information for pages, wherein each page has an address that identifies the source of the page, wherein each address comprises a plurality of identifiers in a hierarchy, comprising:

displaying pages within windows on a display in a hierarchical relationship; and in response to a user requesting a change to a current window in the plurality of windows, updating the pages in other of the plurality of windows to maintain the hierarchical relationship, and wherein the updating step further comprises determining a parent page for each page by clipping a most-narrow identifier in the page addresses.

2. The method of claim 1, further comprising:

detaching the current window from the hierarchical relationship.

3. The method of claim 1, further comprising:

deleting the current window from the plurality of windows.

4. The method of claim 1, wherein the hierarchical relationship further comprises: a parent-child relationship between pages in successive windows.

5. The method of claim 1, wherein the page address further comprises delimiters between the identifiers and the determining step further comprises clipping the identifier following a last delimiter.

6. The method of claim 1, further comprising:

in response to the user requesting a new page in the current window, retrieving the new page and displaying the new page in a first window in the plurality of windows.

7. The method of claim 6, further comprising:

determining the addresses of ancestor pages of the new page;

retrieving the ancestor pages using the addresses; and displaying the ancestor pages in successive windows to the first window.

8. The method of claim 1, further comprising:

in response to the user requesting a new page in the current window, retrieving the new page and displaying the new page in a current window in the plurality of windows.

9. The method of claim 8, further comprising:

determining the addresses of ancestor pages of the new page;

retrieving the ancestor pages using the addresses; and displaying the ancestor pages in successive windows to the current window.

10. The method of claim 1, wherein the most-narrow identifier comprises a file name.

11. The method of claim 1, wherein the address comprises a Uniform Resource Locator (URL).

12. The method of claim 1, wherein the displaying step further comprises:

concurrently displaying the plurality of windows, wherein each of the plurality of windows is at least partially visible.

13. The method of claim 12, wherein the displaying step further comprises:

displaying the plurality of windows in a cascading format.

14. A program product that provides contextual information for pages, wherein each page has an address that identifies the source of the page, wherein each address comprises a plurality of identifiers in a hierarchy, comprising:

a browser that displays pages within windows on a display in a hierarchical relationship and in response to a user requesting a change to a current window in the plurality of windows, the browser updates the pages in other of the plurality of windows to maintain the hierarchical relationship, and wherein the browser updates the pages by determining a parent page for each page by clipping a most-narrow identifier in the page addresses; and signal-bearing media bearing the browser.

15. The program product of claim 14, wherein the browser further detaches the current window from the hierarchical relationship.

16. The program product of claim 14, wherein the browser further deletes the current window from the plurality of windows.

17. The program product of claim 14, wherein the hierarchical relationship that the browser maintains gives a parent-child relationship to pages in successive windows.

18. The program product of claim 14, wherein the page address further comprises delimiters between the identifiers and the browser further clips the identifier following a last delimiter.

19. The program product of claim 14, wherein in response to the user requesting a new page in the current window, the browser retrieves the new page, and displays the new page in a first window in the plurality of windows.

20. The program product of claim 19, wherein the browser determines the addresses of ancestor pages of the new page, retrieves the ancestor pages using the addresses, and displays the ancestor pages in successive windows to the first window.

21. The program product of claim 14, wherein in response to the user requesting a new page in the current window, the browser retrieves the new page, and displays the new page in a current window in the plurality of windows.

22. The program product of claim 21, wherein the browser determines the addresses of ancestor pages of the new page, retrieves the ancestor pages using the addresses, and displays the ancestor pages in successive windows to the current window.

23. The program product of claim 14, wherein the most-narrow identifier is a file name.

24. The program product of claim 14, wherein the address comprises a Uniform Resource Locator (URL).

25. The program product of claim 14, wherein the browser concurrently displays the plurality of windows, and each of the plurality of windows is at least partially visible.

26. The program product of claim 25, wherein the browser displays the plurality of windows in a cascading format.

27. A computer system, comprising:

a processor;

memory;

a window list residing in the memory and comprising a plurality of elements that describe a plurality of windows on a display and a hierarchical relationship of the plurality of windows; and a browser residing in the memory and executing on the processor, wherein the browser displays pages within windows on a display in a hierarchical relationship, wherein each page has an address that identifies the source of the page, wherein each address comprises a plurality of identifiers in a hierarchy, and in response to a user requesting a change to a current window in the plurality of windows, the browser updates the pages in other of the plurality of windows to maintain the hierarchical relationship, and wherein the browser updates the pages by determining a parent page for each page by clipping a most-narrow identifier in the page addresses.

28. The computer system of claim 27, wherein the browser further detaches the current window from the hierarchical relationship.

29. The computer system of claim 27, wherein the browser further deletes the current window from the plurality of windows.

30. The computer system of claim 27, wherein the hierarchical relationship that the browser maintains gives a parent-child relationship to pages in successive windows.

31. The computer system of claim 27, wherein the page address further comprises delimiters between the identifiers and the browser further clips the identifier following a last delimiter.

32. The computer system of claim 27, wherein in response to the user requesting a new page in the current window, the browser retrieves the new page, and displays the new page in a first window in the plurality of windows.

33. The computer system of claim 32, wherein the browser determines the addresses of ancestor pages of the new page, retrieves the ancestor pages using the addresses, and displays the ancestor pages in successive windows to the first window.

34. The computer system of claim 27, wherein in response to the user requesting a new page in the current window, the browser retrieves the new page, and displays the new page in a current window in the plurality of windows.

35. The computer system of claim 34, wherein the browser determines the addresses of ancestor pages of the new page, retrieves the ancestor pages using the addresses, and displays the ancestor pages in successive windows to the current window.

36. The computer system of claim 27, wherein the most-narrow identifier is a file name.

37. The computer system of claim 27, wherein the address comprises a Uniform Resource Locator (URL).

38. The computer system of claim 27, wherein the browser concurrently displays the plurality of windows, and each of the plurality of windows is at least partially visible.

39. The computer system of claim 38, wherein the browser displays the plurality of windows in a cascading format.

* * * * *